(12) United States Patent
Mizuo et al.

(10) Patent No.: US 10,439,525 B2
(45) Date of Patent: Oct. 8, 2019

(54) MOTOR DRIVE DEVICE AND METHOD FOR DRIVING MOTOR

(71) Applicant: CANON KABUSHIKI KAISHA, Tokyo (JP)

(72) Inventors: Yoshihiro Mizuo, Tokyo (JP); Nobuyuki Horie, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/992,594

(22) Filed: May 30, 2018

(65) Prior Publication Data
US 2018/0351484 A1 Dec. 6, 2018

(30) Foreign Application Priority Data

Jun. 5, 2017 (JP) ................... 2017-110755
Nov. 30, 2017 (JP) ................... 2017-230828
May 17, 2018 (JP) ................... 2018-095541

(51) Int. Cl.
*H02P 6/08* (2016.01)
*H02P 6/16* (2016.01)
*H02P 6/24* (2006.01)
*H02P 6/20* (2016.01)

(52) U.S. Cl.
CPC .......... *H02P 6/16* (2013.01); *H02P 6/20* (2013.01); *H02P 6/24* (2013.01); *H02P 2209/11* (2013.01); *H02P 2209/13* (2013.01)

(58) Field of Classification Search
USPC .............. 318/264–286, 466–469, 626
See application file for complete search history.

(56) References Cited

U.S. PATENT DOCUMENTS

| | | | |
|---|---|---|---|
| 6,400,107 B1 * | 6/2002 | Nakatani | H02P 6/085 318/400.21 |
| 6,900,604 B2 * | 5/2005 | Kokami | H02P 6/182 318/400.33 |
| 7,102,306 B2 * | 9/2006 | Hamaoka | F04B 35/04 318/400.01 |

(Continued)

FOREIGN PATENT DOCUMENTS

| | | |
|---|---|---|
| JP | 2014045646 A | 3/2014 |
| JP | 2016154422 A | 8/2016 |

*Primary Examiner* — Bentsu Ro
(74) *Attorney, Agent, or Firm* — Carter, DeLuca & Farrell LLP

(57) ABSTRACT

A motor drive device includes a detecting unit that detects a rotational position of a rotor, a drive waveform generating circuit that generates a drive waveform, a control unit that synchronizes a phase of the rotational position of the rotor and a phase of the drive waveform, and a phase difference setting unit that sets a phase difference between the rotational position and the drive waveform during synchronization. An Apos generating unit calculates and outputs a position count proportional to a rotation amount of the rotor. A Bpos generating unit acquires the position count from the Apos generating unit and converts the count into a count value with the upper limit value as the maximum value. A Cpos generating unit multiplies the count value acquired from the Bpos generating unit by the conversion ratio, and calculates a count value with a predetermined upper limit value as the maximum value.

20 Claims, 23 Drawing Sheets

(56) References Cited

U.S. PATENT DOCUMENTS

| | | | |
|---|---|---|---|
| 7,626,350 B2* | 12/2009 | Mori | H02P 6/10 318/432 |
| 9,917,539 B1* | 3/2018 | Omura | H02P 6/16 |
| 2013/0002178 A1* | 1/2013 | Endou | H02P 6/182 318/400.11 |

* cited by examiner

MOTOR DRIVE DEVICE AND METHOD FOR DRIVING MOTOR

BACKGROUND OF THE INVENTION

Field of the Invention

The present invention relates a motor drive device, a method for driving a motor and, in particular, relates to a technique that generates an efficient drive waveform to a detected the position of the rotation of a rotor.

Description of the Related Art

In motor drive control, there is a technique that achieves efficient rotational driving by providing a rotational position detecting mechanism on a rotational shaft of a motor, and applying a drive waveform to the motor based on the detected rotational position. Using a sine-wave drive waveform for the drive waveform of the motor allows controlling the rotational position of the motor more precisely than using a square drive waveform. A device disclosed in Japanese Patent Application Laid-Open No. 2014-45646 generates a sine-wave drive signal with an efficient phase from a square wave position detecting sensor in a motor configuration in which a magnet is arranged on the rotor side and a coil winding is arranged on the stator side. Additionally, Japanese Patent Application Laid-Open No. 2016-154422 discloses a technique that improves resolution to a change in sine-wave of a position detecting unit, and improves efficiency of the rotational driving by compensating for amounts of deviation if the relation between a rotor detection phase and a drive waveform phase deviates from a target.

In the conventional techniques, a compensation process is performed after a difference is detected due to a deviation in the ideal relation between the rotor rotation phase and the drive waveform phase. Accordingly, if a response is delayed from the point in time that the difference has been detected until the point in time that the compensation process has been completed, a response potential of the mechanism unit may be insufficiently exhibited during the acceleration and deceleration of the motor or the occurrence of disturbance. Additionally, in improving a precision of the position detecting mechanism unit, for example, the design of the mechanism unit is constrained.

SUMMARY OF THE INVENTION

An object of the present invention is to provide a motor drive device that can acquire rotational position information of a rotor detected by a rotational position detecting unit having a high degree of freedom and generate a drive waveform with efficiency and less response delay to the motor, and to provide a method for driving a motor.

An apparatus according to an embodiment of the present invention is a motor drive device that drives a motor to rotate comprising: at least one processor or one circuitry which functions as: a detecting unit configured to detect a rotational position of a rotor; a generating unit configured to generate a drive waveform to be output to the motor; a control unit configured to perform control that synchronizes a phase of the rotational position and a phase of the drive waveform; and a phase difference setting unit configured to set a phase difference between the rotational position and the drive waveform to a state in which the phase of the rotational position and the phase of the drive waveform are synchronized. The detecting unit comprises: a first calculating unit configured to calculate a first count value based on a plurality of signals that changes with the rotation of the rotor; a second calculating unit configured to acquire the first count value and calculate a second count value having a first upper limit value; and a third calculating unit configured to acquire the second count value, perform a process that multiplies the second conversion value by a conversion ratio that has been set, and calculate a third count value having a second upper limit value.

According to the present invention, it is possible to provide a motor drive device that can acquire information about a rotational position detected by a rotational position detecting unit having a high degree of freedom, and generate a drive waveform with efficiency and less response delay to a motor, and to provide a method for driving a motor.

Further features of the present description will be apparent from the following description of the example (with reference to the attached drawings).

DESCRIPTION OF THE EMBODIMENTS

Hereinafter, preferred embodiments of the present invention will be described in detail with reference to the accompanying drawings. A motor drive device of the present embodiment can be applied to various devices including an imaging apparatus, an optical disk device, a printer, and a projector. A motor drive device can configure a motor system by combining with a motor by which the driving is controlled, and the system can be applied to various devices such as an imaging apparatus, an optical disk apparatus, a printer, and a projector. For example, in application to an imaging apparatus, the motor drive device can be used for driving various types of optical elements such as a zoom lens, a focus lens, an optical diaphragm, and a shutter.

In motor drive control, there is a method for increasing the resolution of drive signals (for example, square wave signals) in order to improve a detection precision of the position detecting mechanism unit of the rotor. In this case, a drawback may occur in which the signal change cannot be sufficiently detected during high-speed rotation of the motor due to the frequency characteristic of the signals, thereby causing a failure to detect the position. Additionally, in terms of motor control, there is need to constrain the number of magnet poles and the number of stators in the motor, and the number of detection waveforms of the position detecting unit. As a result, drawbacks such as cost increase, constraint in design of the mechanical unit, and increase in size may be caused. The present embodiment will describe a motor drive technique that can generate a drive waveform with efficiency and less response delay to the motor based on the rotational position of the rotor detected by the rotational position detecting mechanism unit after permitting the selection of the rotational position detecting mechanism unit with a high degree of freedom. Note that the detailed description will be given for each embodiment after describing issues shared by each embodiment.

Figure 1:
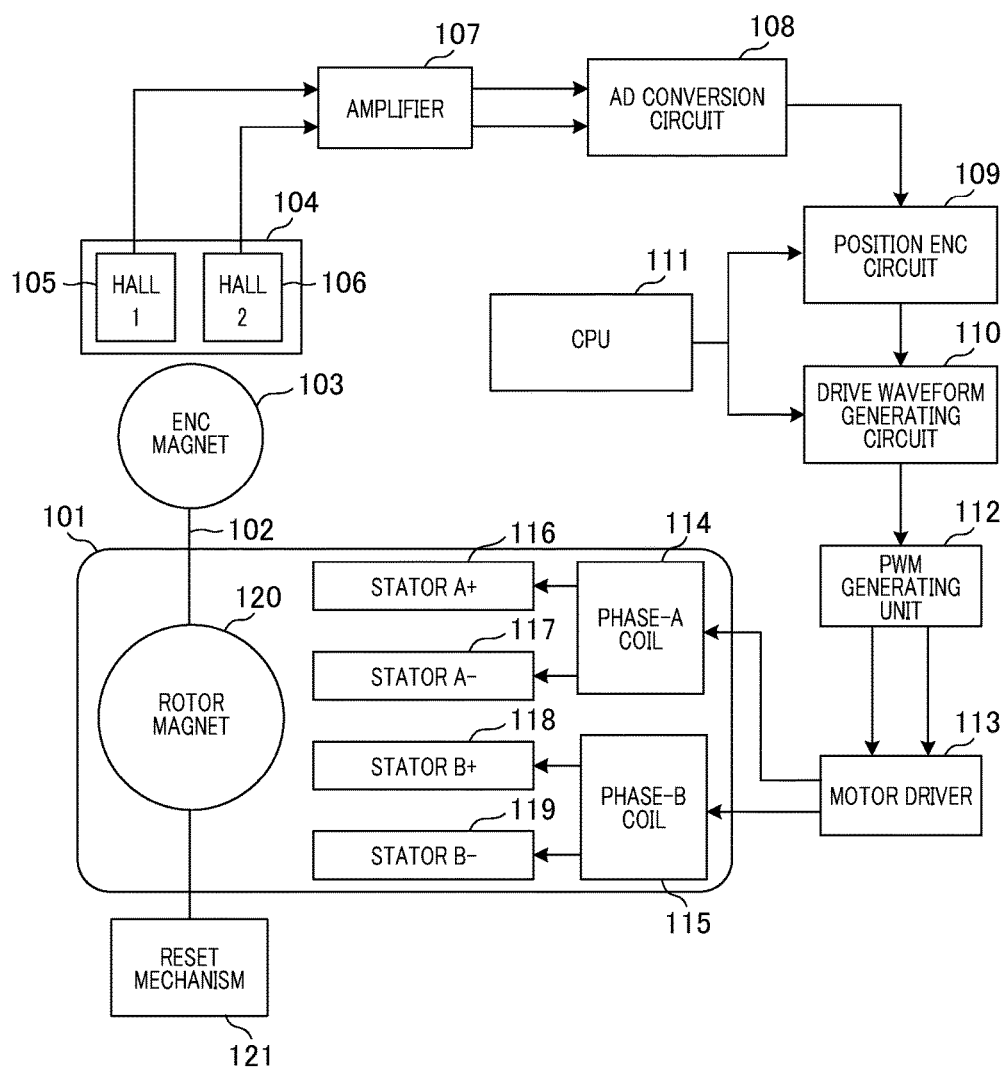
FIG. 1 is a block diagram illustrating a schema of a system according to the present embodiment.

FIG. 1 is a block diagram that illustrates a schema of a system of the present embodiment, and illustrates a configuration of a motor drive device including a driving electric circuit. A stepping motor 101 includes an ENC (encoding) magnet 103 on a rotor shaft 102. The ENC magnet 103 is magnetized so that a magnetic field circumferentially generated around the rotation axis generates a sine-wave magnetic field in accordance with the rotational position. Additionally, the stepping motor 101 includes a reset mechanism 121. The reset mechanism 121 is configured to output signals that change at one particular position in accordance with the rotation of the rotor shaft 102. This signal supplies a reference of the absolute value of the rotational position of the motor. Specifically, in the reset mechanism 121, the rotor shaft 102 includes a screw shaft, and a slit is formed in a moving body that translates in accordance with the rotation of the screw shaft. The slit shields a photo interrupter to change the output signals.

A Hall element package 104 is a magnetic detection unit of the ENC magnet 103, includes a plurality of Hall elements, and can detect and output a change in the magnetic field caused by the rotation of the ENC magnet 103. For example, Hall elements 105 and 106 detect changes in the magnetic field caused by the rotation of the ENC magnet 103 at each position, and output the detected signals to an amplifier 107. When viewed from the center position of the ENC magnet 103, the Hall elements 105 and 106 are arranged equally separated from the center position with a phase difference of 90 degrees, which serves as the signal phases detected by the two Hall elements. Signals output from each of the Hall elements 105 and 106 are position detection signals of analog signals. A specific example will be described with reference to FIG. 2.

Figure 2C:
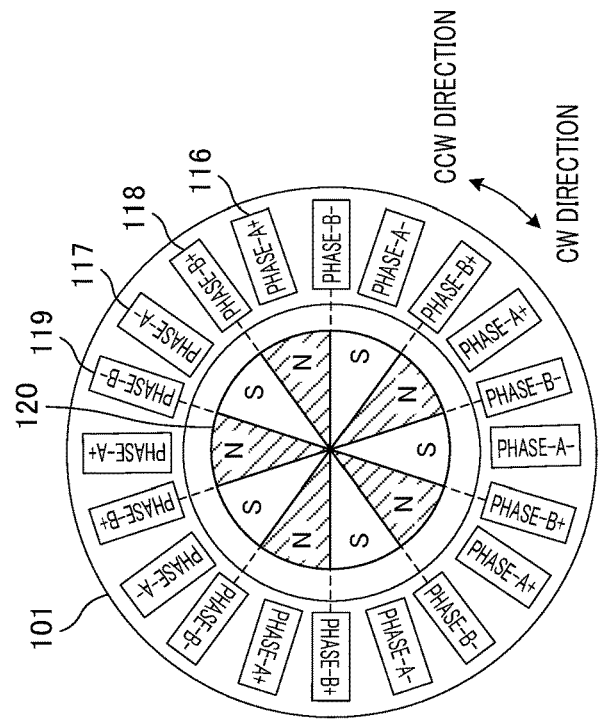
FIGS. 2A to 2C are schematic diagrams illustrating a configuration of a motor and a position detecting sensor according to the present embodiment.
Figure 2B:
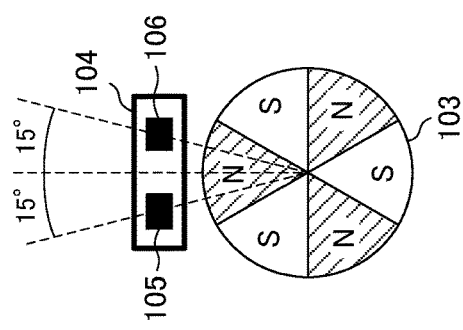
Figure 2A:
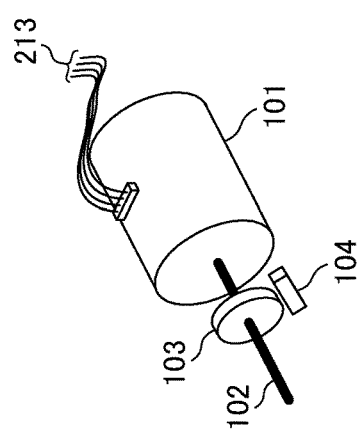

FIG. 2A is a perspective view illustrating an example of an external view of the stepping motor 101. The short cylindrical ENC magnet 103 is disposed on the rotor shaft 102 of the stepping motor 101. The Hall element package 104 is disposed at a position where the magnetic field generated by the ENC magnet 103 can be detected. A wiring member 213 is drawn out from the stepping motor 101 to the outside, and the wiring member 213 is connected to a motor driver 113 to be described below.

FIG. 2B schematically illustrates the positional relation between the ENC magnet 103 and the Hall elements 105 and 106. The ENC magnet 103 is a magnet with three pairs of poles (six poles), in which three N pole regions and three S pole regions are arranged at 60 degree intervals and magnetically held to each other. When viewed from the center position of the ENC magnet 103, the Hall elements 105 and 106 are arranged equally separated from the center position. This indicates that an angle where the Hall elements 105 and 106 meet at the center position, in other words, a physical angle formed by the two hall elements 105 and 106 with respect to the center position (physical angle) is 30 degrees. The signal phase detected by the two Hall elements is a phase difference of 90 degrees.

The amplifier 107 in FIG. 1 amplifies weak signals input from each of the Hall elements 105 and 106 and outputs the amplified signals to an A/D conversion circuit 108 to be described below. The A/D conversion circuit 108 converts the analog voltage signals input from the amplifier 107 into digital signals and digitizes the signals, and outputs the converted result as digital numerical signals to a position ENC circuit 109. Since the Hall element periodically outputs the analog position detection signals, A/D conversion by using the A/D conversion circuit 108 is periodically performed.

The position ENC circuit 109 functions as a detecting unit that detects the rotational position of the motor and performs an encoding process on the signals input from the A/D conversion circuit 108. Specifically, the position ENC circuit 109 calculates the rotational position by using the ArcTan (arc tangent) calculation, based on the position detection signal input from the A/D conversion circuit 108. The position ENC circuit 109 includes a processing unit that adjusts an offset and a gain of the two input signals and an acquiring unit that acquires rotational position information based on the adjusted signals. The position ENC circuit 109 performs offset adjustment and gain adjustment of the input detection signal by the processing unit. This adjustment is performed so as to match the offset and the gain of the detection signals. This adjustment is performed by detecting the maximum value and the minimum value of the two signals by rotating the motor by OPEN driving and using the detected result. The position ENC circuit 109 generates a TAN value (tangent value) based on two detected sine-wave signals having a phase difference of 90 degrees and subsequently performs ArcTAN calculation (arctangent calculation) to generate the rotation angle information. This rotation angle information is a count value proportional to the rotation amounts of the rotor, and rotational position information is generated by integrating the rotation angle information. The generated rotational position information is transmitted to a drive waveform generating circuit 110.

The drive waveform generating circuit 110 generates a drive waveform for the motor. The drive waveform generating circuit 110 switches between OPEN driving and CLOSE driving. The OPEN driving is driving that outputs sine-wave signals for driving with different phases at a preset frequency. The CLOSE driving is driving that outputs a drive waveform linked to the position ENC circuit 109. The OPEN driving and the CLOSE driving are switched in accordance with a command from a CPU (Central Processing Unit) 111. Additionally, the drive waveform generating circuit 110 determines information about the phase count of a drive waveform to be applied to a phase-A coil 114 and a phase-B coil 115, and transmits a PWM command value to a PWM (Pulse Width Modulation) generating unit 112.

The CPU 111 instructs the drive waveform generating circuit 110 to switch between the OPEN driving and the CLOSE driving to set a frequency and an amplitude gain value of the output sine-wave signals during OPEN driving. Additionally, the CPU 111 performs, for example, initialization setting of the position count value to the position ENC circuit 109. Also, the CPU 111 sets the frequency and amplitude gain value of the output sine-wave signals of the drive waveform generating circuit 110 and initializes the position count value of the position ENC circuit 109 and the like. A process performed by the position ENC circuit 109 and the drive waveform generating circuit 110 will be described below with reference to FIGS. 3 to 5.

The PWM generating unit 112 outputs PWM signals to the motor driver 113 in accordance with the PWM command value output from the drive waveform generating circuit 110. The PWM signals will be described below with reference to FIG. 7.

The motor driver 113 performs amplification in accordance with a command value output from the PWM generating unit 112 and applies a voltage to the phase-A coil 114 and the phase-B coil 115 of the stepping motor 101. While the signals applied to the motor are high-frequency voltage signals corresponding to the PWM signals, the current value signals generated in a coil are the same as the case in which an LPF (low-pass filter) is applied due to an L (inductance) component of the coil. This fact indicates that this is effectively similar to a case in which the sine-wave signal-like voltage to be described in FIG. 7 is applied to the coil.

A stator A+ 116 and a stator A− 117 of the stepping motor 101 each have the functions of concentrating and discharging the magnetic fields generated at both ends of the phase-A coil. A stator B+ 118 and a stator B− 119 each have the functions of concentrating and discharging the magnetic fields generated at both ends of the phase-B coil. Thereby, the rotor magnet 120 rotates. With reference to FIG. 2C, the arrangement relation between the stators A+ and A−, the stators B+ and B−, and the rotor magnet will be specifically described.

In FIG. 2C, the stator A+ 116, the stator A− 117, the stator B+ 118, and the stator B− 119 are arranged in a positional relation with a physical angle of 18 degrees therebetween. The rotating direction of a rotor magnet 120 is clockwise or counterclockwise. In this example, a total of five pairs of stator groups are arranged. The rotor magnet 120 is located at the center of the stator groups, with a total of ten magnetic poles consisting of five N-poles and five S-poles each. Every time one sine-wave of the drive waveform is output, the rotor magnet 120 rotates by a physical angle of 72 degrees.

Figure 3:
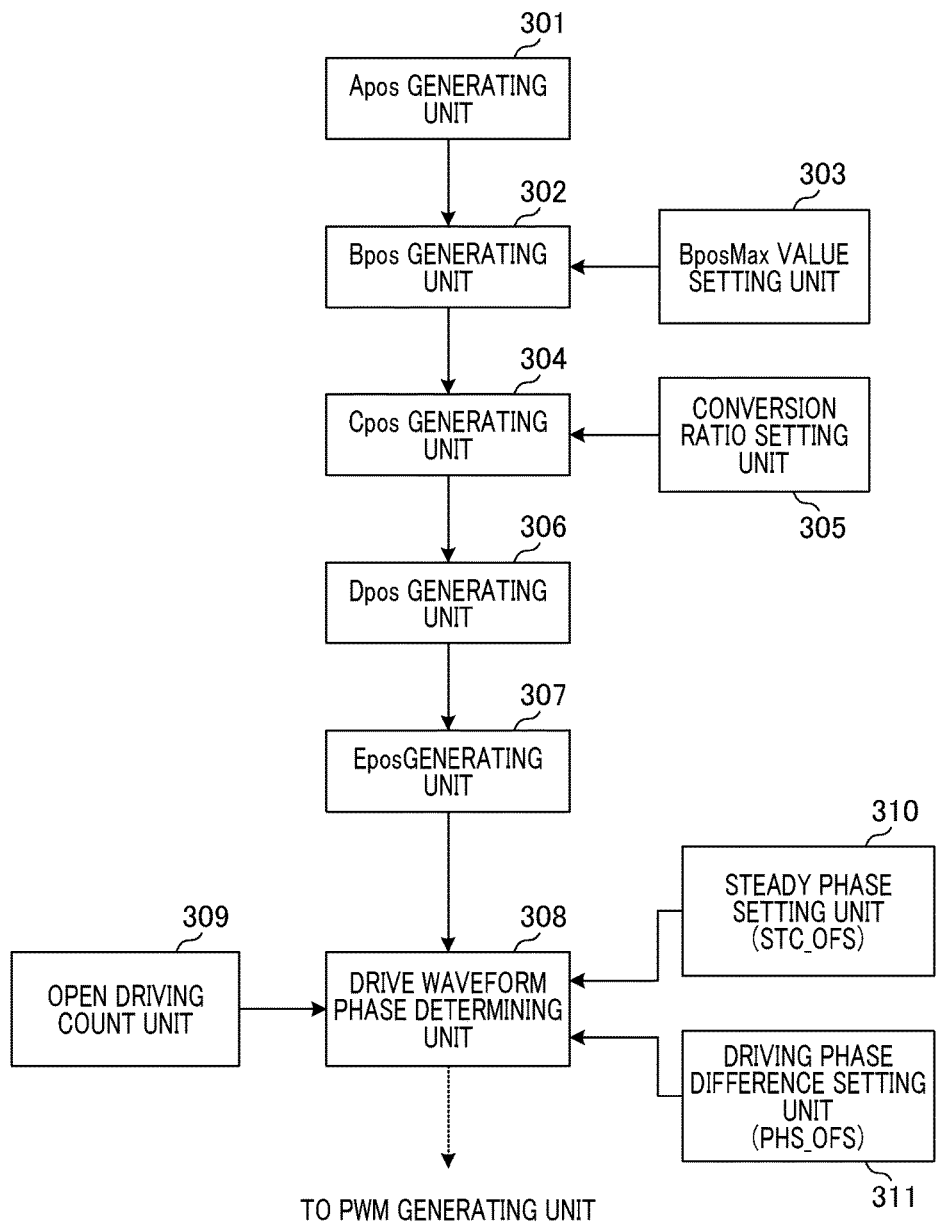
FIG. 3 is a diagram illustrating a position ENC circuit and a drive waveform generating circuit according to the present embodiment.

Next, a process of the position ENC circuit 109 and the drive waveform generating circuit 110 will be described in detail. FIG. 3 is a block diagram illustrating in detail a process of the position ENC circuit 109 and the drive waveform generating circuit 110. An Apos generating unit 301 to an Epos generating unit 307 correspond to the position ENC circuit 109. A drive waveform phase determining unit 308 to a drive phase difference setting unit 311 corresponds to the drive waveform generating circuit 110.

The output signal of the Hall element 105 is denoted "detection signal 1", and the output signal of the Hall element 106 is denoted "detection signal 2". The detection signals 1 and 2 are input to the A/D conversion circuit 108 via the amplifier 107, and the Apos generating unit 301 acquires the A/D-converted signals. The Apos generating unit 301 calculates the rotational position by using the ArcTan (arctangent) calculation. As preprocessing, offset and gain adjustment of the two input signals are performed. That is, the adjustment for matching the offset and the gain of the two signals is performed. This adjustment is performed by detecting the maximum value and the minimum value of the two signals by rotating the motor by OPEN driving and using the result. After adjustment, a tangent value is calculated with two sine-wave-like signals having a phase difference of 90 degrees, and when an arctangent calculation is performed, rotation angle information (Apos) is generated. The rotational position information can be generated by calculating a value acquired by integrating the value of this rotation angle. The relation between the detection signals 1 and 2 and the rotational position information will be described with reference to the example in FIG. 5.

Figure 5:
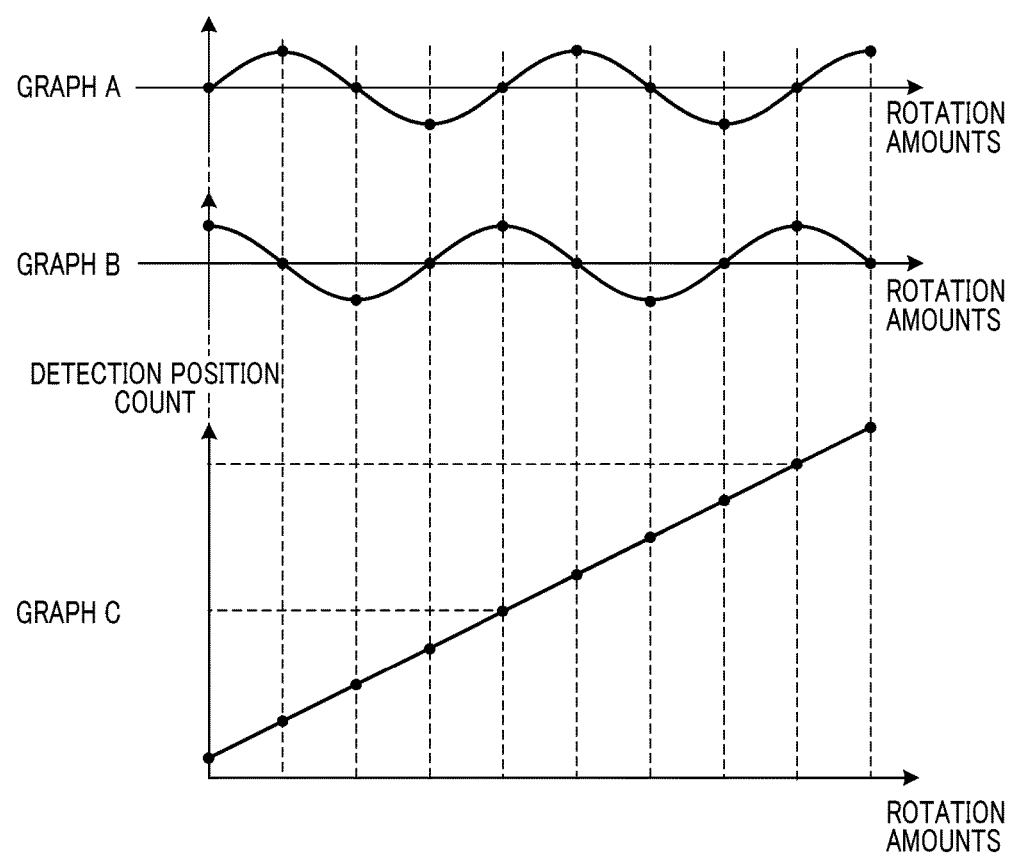
FIG. 5 is a diagram illustrating a relation between a position detecting sensor signal and a detection position count.

The relation between the detection signal by the Hall elements 105 and 106 and the rotational position of the stepping motor 101 in FIG. 1 will be described with reference to FIG. 5. A graph A and a graph B in FIG. 5 illustrate signals after adjusting the gain and the offset of the detection signals that have been detected from each Hall element. The signals shown in the graph A in FIG. 5 are sine-wave signals, and the signals shown in the graph B in FIG. 5 are cosine-wave signals. The position ENC circuit 109 acquires the rotation angle information from two sine-wave signals having the phase difference of 90 degrees and outputs the rotation angle information to the drive waveform generating circuit 110. The rotation angle information is used as a count value of the detected position. As described above, in the present embodiment, the position detection signals are acquired as a sine-wave. Accordingly, the position can be detected at any timing and with high resolution, as compared with the motor drive device that acquires the position detection signals as a square wave, so that acceleration and deceleration performance of the motor can be improved. A graph C in FIG. 5 is a graph showing the relation between the count value of the detected position (vertical axis) and the rotation amounts of the rotor (horizontal axis). In the present embodiment, it is assumed that position detection can be performed with a position resolution by 1024 counts when signals of the two Hall elements are output by one wavelength of the sine-wave. The count value of the detected position is stored in a storage region of the Apos generating unit 301 in FIG. 3. When the Apos generating unit 301 completes the process, a Bpos generating unit 302 takes over the process.

The Bpos generating unit 302 in FIG. 3 generates Bpos acquired by converting the value of Apos into position signals in which the upper limit value set in advance by the CPU 111 through the BposMax value setting unit 303 is set as the maximum value (BposMax value). The BposMax value set through the BposMax value setting unit 303 is set as a value corresponding to the position count detected by the Apos generating unit 301 when the motor rotates by exactly one rotation.

Figure 4A:
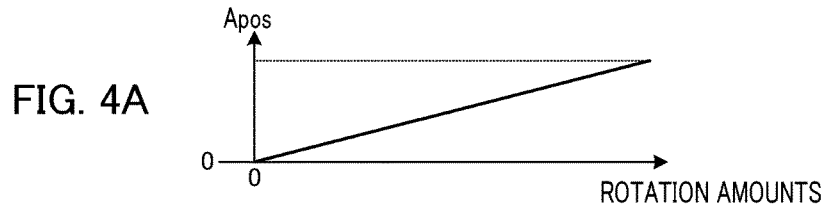
FIGS. 4A to 4G are diagrams illustrating a relation between a detection position of the motor, a count value, and a drive waveform.
Figure 4B:
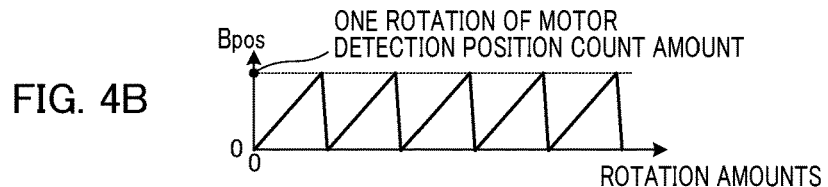

FIG. 4A shows Apos and FIG. 4B shows Bpos. The horizontal axis of each graph shown in FIG. 4 represents the rotation amounts of the rotor. The value of Apos is a count value proportional to the rotation amounts of the rotor. Additionally, the value of Bpos is a signal value of a sawtooth wave that periodically changes with respect to the rotation amounts between zero and the upper limit value (maximum value).

Figure 4C:
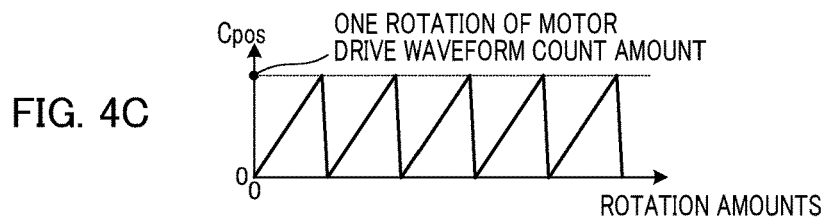

When Bpos is generated by the Bpos generating unit 302, the process is transferred to a Cpos generating unit 304 in FIG. 3. The Cpos generating unit 304 multiplies the result value of Bpos by the conversion ratio set in advance by the CPU 111 via a conversion ratio setting unit 305, and holds the value of the calculation result as Cpos. The conversion ratio set here is a ratio for converting the detection position count value for one rotation of the rotor into the drive waveform count value for one rotation of the rotor, and is realized by using multiplication number and right bit shift calculation. The shift number of the right bit shift calculation is determined based on the count conversion precision, which is necessary for driving. An example of Cpos is shown in FIG. 4C. The value of Cpos is a signal value of the sawtooth wave that periodically changes between zero and the upper limit value with respect to the rotation amounts. Specifically, as shown in FIG. 4C, the value of Bpos shown in FIG. 4B is converted into the position information in which a value corresponding to the count number of the drive waveform corresponding to one rotation of the motor serves as the Max value. When the Cpos generating unit 304 generates Cpos, the process is subsequently transferred to a Dpos generating unit 306.

Figure 4D:
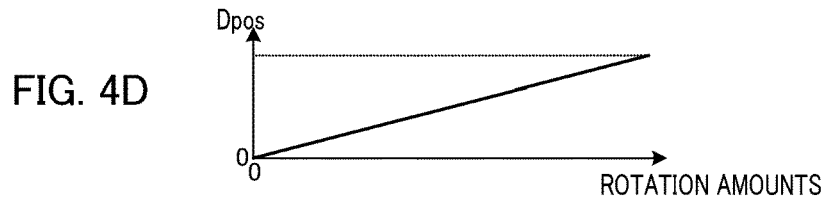
Figure 4E:
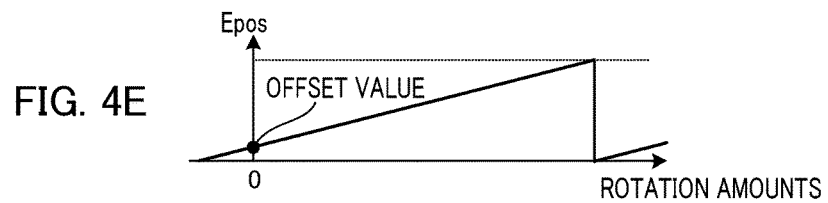

The Dpos generating unit 306 in FIG. 3 integrates a range of values of Cpos that overflows or underflows with amounts of a drive count for one rotation of the motor to calculate amounts of integration of the rotational position. The position information generated by the calculation is denoted "Dpos". FIG. 4D illustrates an example of Dpos. The Epos generating unit 307 generates data having any offset value to Dpos (referred to as "Epos"). Epos can be rewritten to any value by the CPU 111 at any timing. At the rewriting timing, the difference between the rewriting value and Dpos is recorded in the memory as an offset value. FIG. 4E illustrates an example of Epos. As shown in FIGS. 4D and 4E, the Epos generating unit 307 generates Epos in a form in which the recorded offset value is always given, in contrast to the value of Dpos.

The position ENC circuit 109 performs each signal generation process by the Apos generating unit 301 to the Epos generating unit 307. In this context, a drawback that occurs if the processes from Bpos to Epos are not performed will be described with reference to FIG. 6. The horizontal axis of each graph shown in FIG. 6 represents the rotational phase of the rotor.

Figure 6:
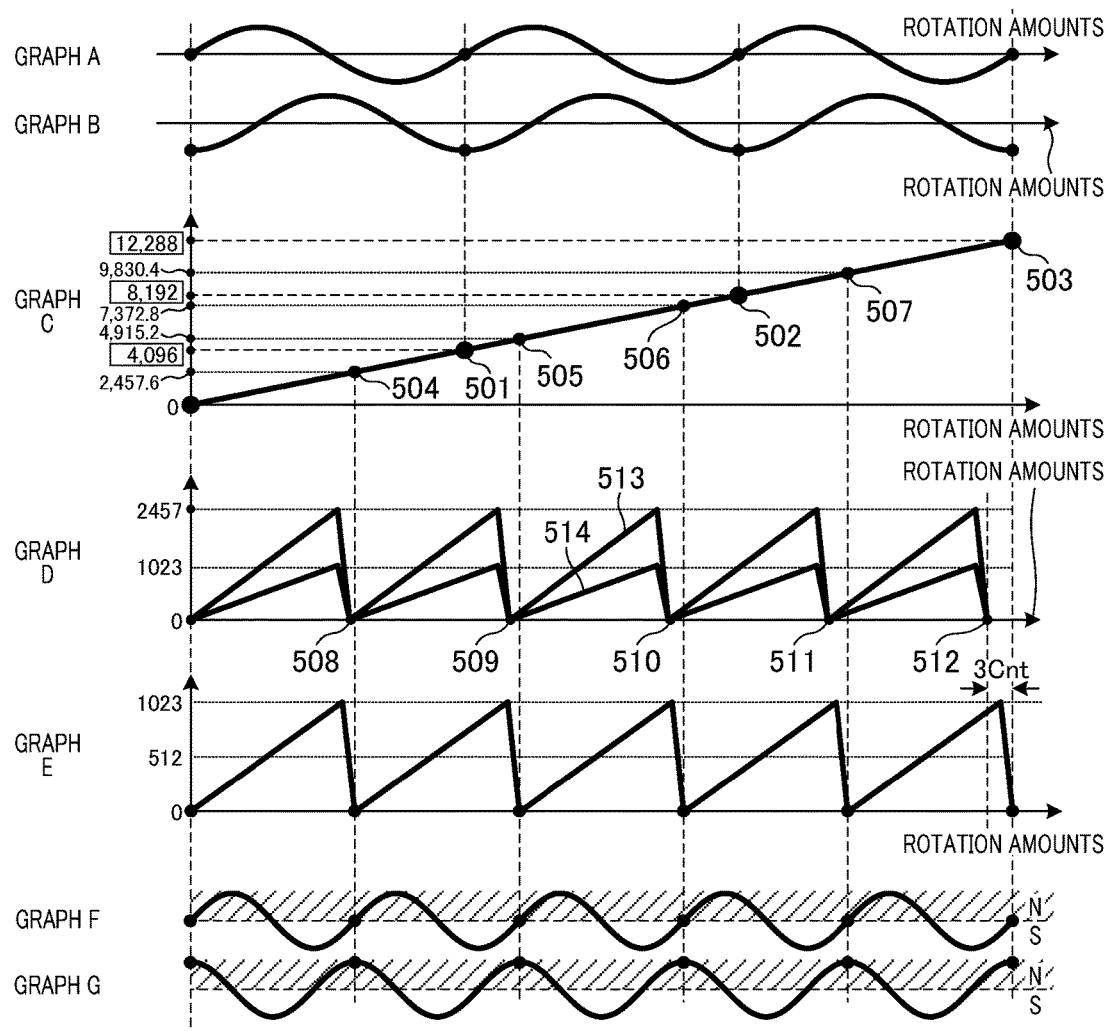
FIG. 6 is a diagram illustrating a drawback that occurs if a signal generating process according to the present embodiment is not performed.

The graphs A and B in FIG. 6 show two position detection signals in which the rotational phase that corresponds to three cycles by one rotation of the motor is indicated. In this example, it is assumed that position count detection with 4096 resolution is possible for one cycle of the sine-wave of the detection signals. The graph C in FIG. 6 illustrates the detection position count. For each one cycle of the position detection signals, 4096 count at position 501, 8192 count at position 502, and 12288 count at position 503 are obtained. In FIG. 6, the graph E illustrates the count value of a drive waveform to be output to the motor during one rotation of the motor, the graph F illustrates the drive waveform for phase-A, and the graph G illustrates the drive waveform for phase-B. In this example, the phase count value of the drive waveform is resolution of 1024 for one cycle of the output sine-wave. When the position detection signals are output for exactly three cycles, the drive waveform needs to be output for exactly five cycles.

In order to synchronize the position count value to be calculated with the drive waveform count value to be output, first, a method for discarding numerals after the decimal point will be considered. Only the value of integer part of 2457.6 acquired by dividing the detection position count 12288 corresponding to one rotation of the motor by 5 is taken and synchronized. In this case, in the graph C in FIG. 6, in accordance with the rotation of the motor, a drive waveform needs to be output each cycle for each position shown by the points 504, 505, 506, and 507, in other words, by each position where detection is impossible without a decimal point as a detection position count. As shown in the graph D in FIG. 6, the count value shown by the graph 513 with the maximum value of 2457 is generated from the detection position count, and the count value shown in the graph 514 is generated by performing the process that multiplies a value corresponding to 1023/2457. In this case, a deviation occurs between the positions shown by the point 508 to the point 512 (the position where the drive waveform is output by one cycle) and the ideal positions, the point 504 to the positions 507 and 503, shown in the graph C in FIG. 6. For example, if a deviation of 0.6×5=3 count is caused when the rotor rotates once, amounts of the deviation are accumulated in accordance with the rotation. When the rotor rotates 100 times, the deviation in count reaches 300 counts, resulting in a failure to achieve the purpose of synchronization between the detection position and the drive waveform.

The drawback occurring when numbers after the decimal point at the detection position are discarded has been described. There is also a method for maintaining a synchronization precision without performing a complicated process by using a high-precision multiplier and divider for Apos in FIG. 4A. However, the bit number of Apos is effectively large, and if the synchronization process is performed by calculating the ratio calculated up to the precision of 1 bit for the large number of bits, another drawback may occur. Specifically, drawbacks such as an increase in circuit scale and a decrease in synchronism with other blocks due to an increase in time for the calculation process are caused. Therefore, in the present embodiment, it is possible to achieve shorting the process time and maintain the precision in detection position and the precision in synchronization by performing the generation process from Bpos to Epos.

The information about Epos generated by the Epos generating unit 307 in FIG. 3 is input to the drive waveform phase determining unit 308. The drive waveform phase determining unit 308 eventually determines the phase count information of the drive waveform to be applied to the phase-A coil 114 and the phase-B coil 115. The drive waveform phase determining unit 308 outputs the PWM value that corresponds to the phase count to the PWM generating unit 112 in FIG. 1. The drive waveform phase determining unit 308 can switch between OPEN driving that outputs phase count information and position-linked driving that outputs the phase count information based on the value of Epos according to a command from an OPEN driving count unit 309. The CPU 111 performs setting to the drive waveform phase determining unit 308 to switch between the OPEN driving and the position-linked driving.

In performing the OPEN driving, the CPU 111 informs the OPEN driving count unit 309 of the frequency of the drive waveform, and sets the drive waveform amplitude gain to the drive waveform phase determining unit 308. Thereby, the drive waveform phase determining unit 308 outputs a drive waveform with a desired frequency and a desired amplitude. In contrast, in performing the position-linked driving, the drive waveform phase determining unit 308 calculates a value acquired by giving a predetermined offset value to the lower 10 bits of Epos. The predetermined offset values are as follows.

The first offset value set by the CPU 111 through a steady phase difference setting unit 310 (STC_OFS value).

The second offset value set by the CPU 111 through the driving phase difference setting unit 311 (PHS_OFS value).

Figure 4F:
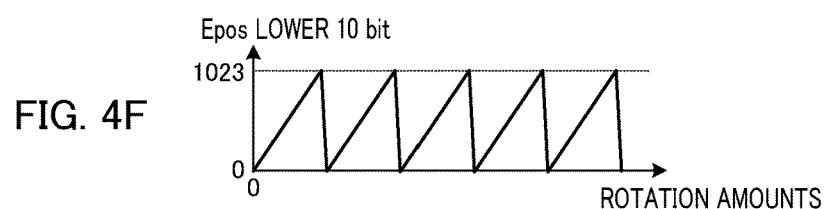
Figure 4G:
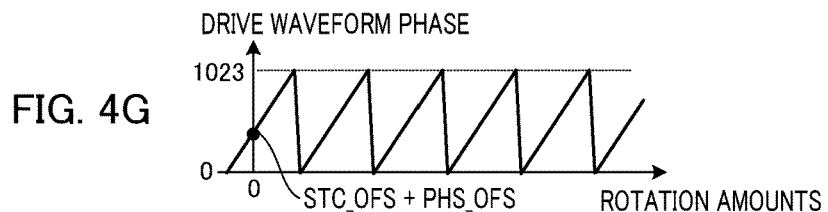

The count value of the drive waveform phase is acquired by calculating a value acquired by giving these offset values. The output value of the phase corresponding to this count value is selected as an output value of the drive waveform. This correlation is shown by each graph in FIGS. 4F and 4G. FIG. 4F illustrates the relation between the value of the lower 10 bits of Epos and the amounts of the rotation. FIG. 4G illustrates the drive waveform after the offset value has been given. The offset value is given by adding both STC_OFS and PHS_OFS to Epos. As will be described below, STC_OFS has a role of managing the stable position of the detected position count of the rotor and the drive waveform count. A role different from the management of phase difference for torque generation is assigned to PHS_OFS.

The drive waveform generating circuit 110 determines the phase of the drive waveform by the drive waveform phase determining unit 308 to the drive phase difference setting unit 311 in FIG. 3, and outputs the PWM command value corresponding to the drive waveform to the PWM generating unit 112. The PWM generating unit 112 outputs the PWM signals to the motor driver 113 in accordance with the PWM command value output from the drive waveform generating circuit 110.

Figure 7A:
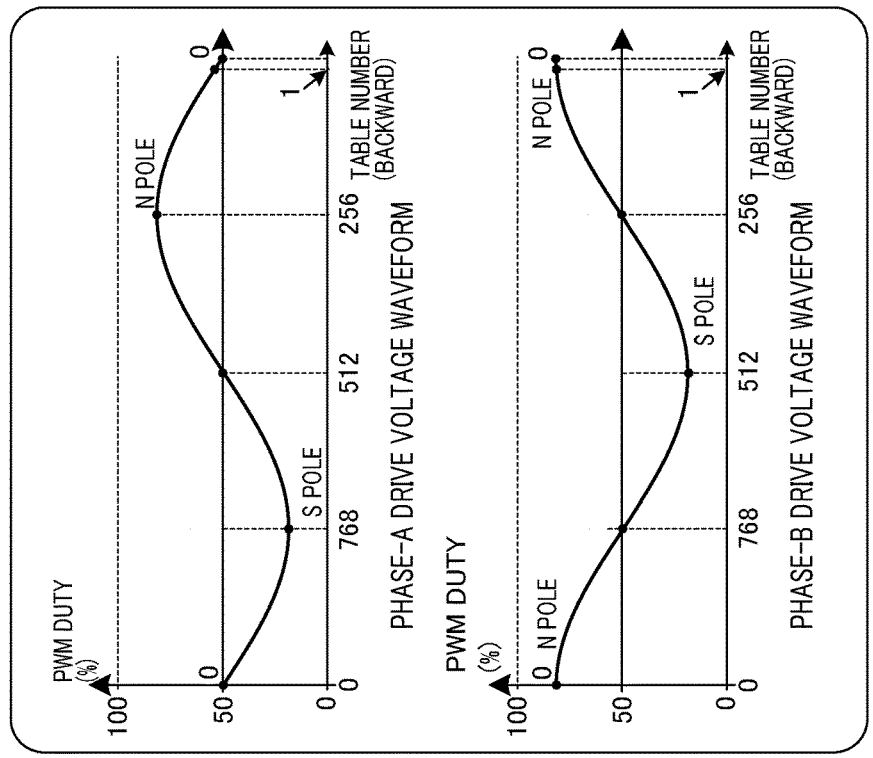
FIGS. 7A and 7B illustrate a relation between a sine-wave position count value and a PWM value (value of duty %).
Figure 7B:
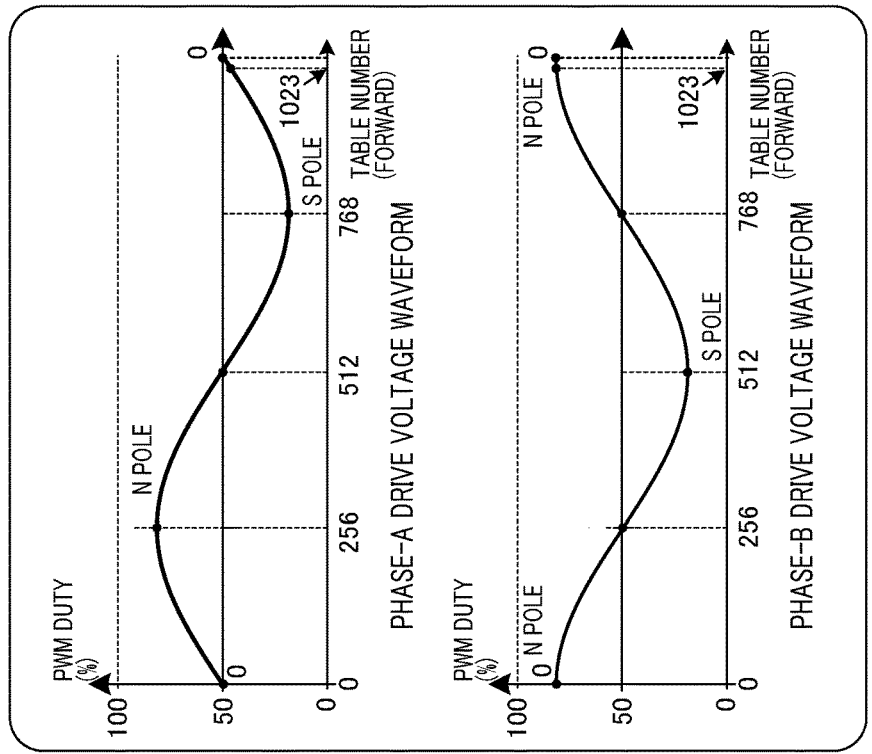

With reference to FIG. 7, the relation between the sine-wave position count value and the PWM value to be output (value of duty %) will be described. In both FIGS. 7A and 7B, the horizontal axis represents the table number, which corresponds to the phase of the voltage waveform and has resolution that is the same as the drive waveform value shown in FIG. 4G. The vertical axis indicates the value of duty % of the PWM signals. In FIG. 7A, the horizontal axis is plus counted and the phase-B drive voltage waveform precedes the phase-A drive voltage waveform by 90 degrees, where the motor rotates clockwise. In contrast, FIG. 7B illustrates that the horizontal axis is minus counted and the phase-A drive voltage waveform precedes the phase-B drive voltage waveform by 90 degrees, where the motor rotates counterclockwise. The value of duty % on the vertical axis increases and decreases depending on the gain setting value. In the present embodiment, it is assumed that an appropriate gain value that does not interfere with the rotational motion of the motor is set.

First Embodiment

Figure 8:
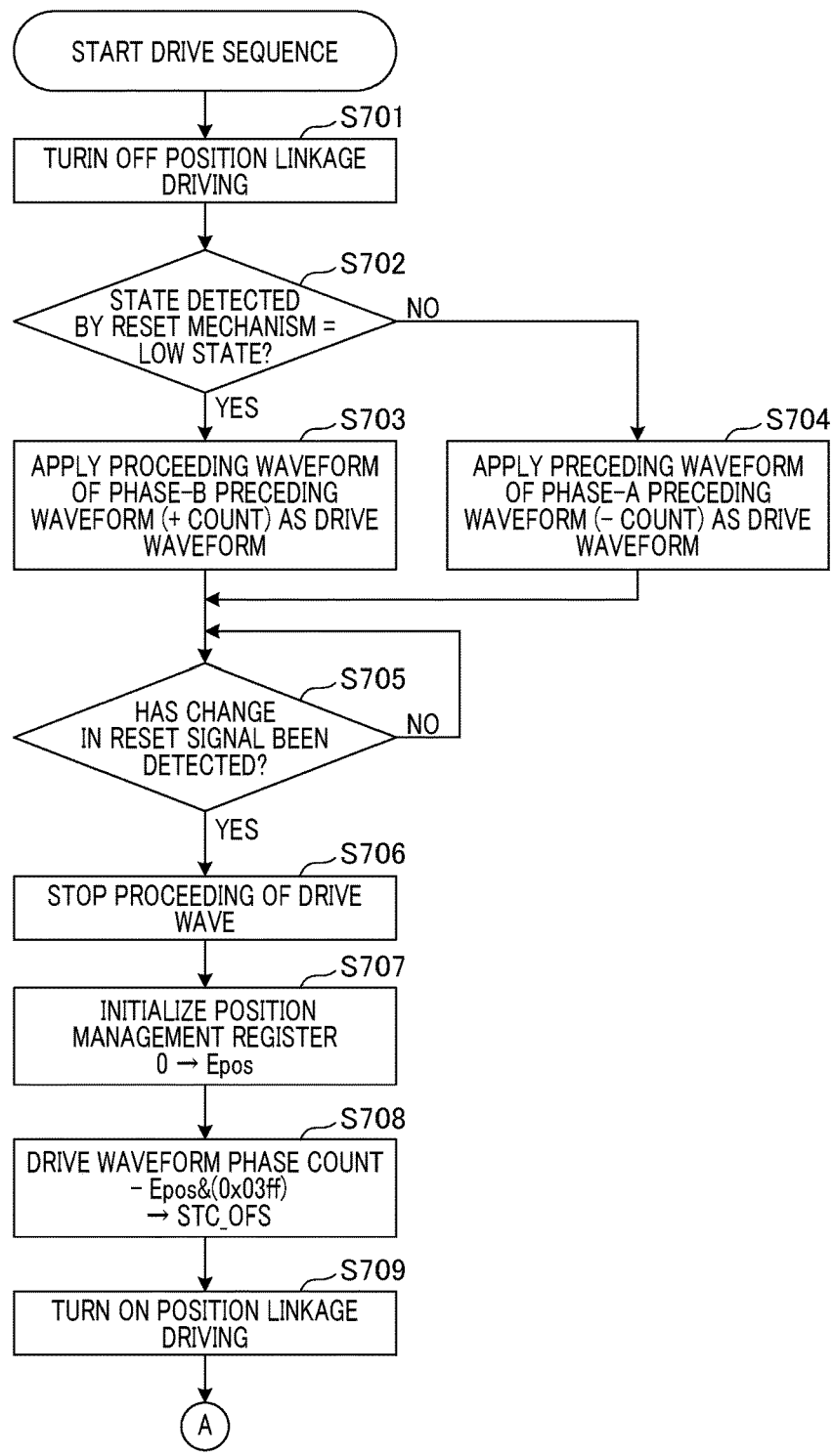
FIG. 8 is a flowchart illustrating a process of the first embodiment.
Figure 9:
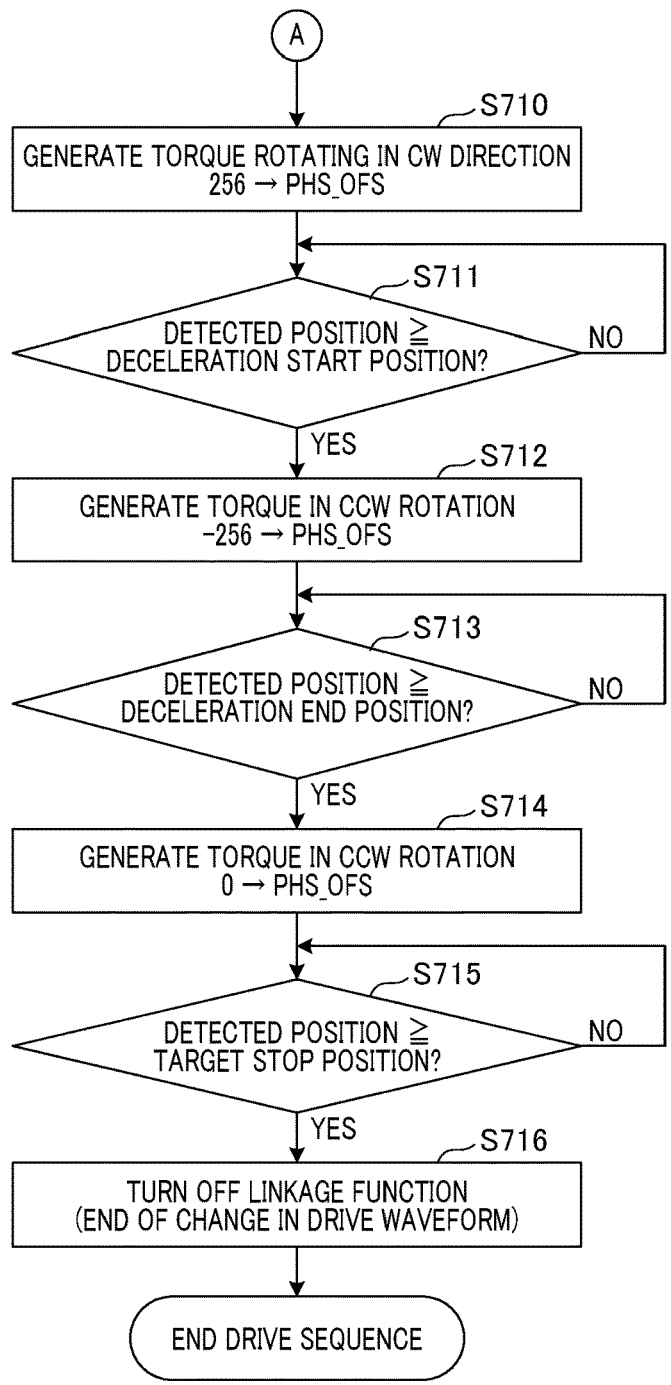
FIG. 9 is a flowchart illustrating a process following FIG. 8.

FIGS. 8 and 9 are flowcharts illustrating the flow of process in the present embodiment. The CPU 111 performs the control to be described below in accordance with a predetermined program. If the drive sequence starts, the process proceeds to step S701 in FIG. 8.

In step S701, a process that sets the position-linked driving to off is executed. That is, OPEN driving is set to operate. In the subsequent step S702, the CPU 111 determines the detection state of the reset signals being output from the reset mechanism 121. The reset signals are binary signals that change to High or Low when a member to be detected passes through a preset position accompanying the movement of the member to be detected that has been attached to a screw mechanism of the rotor shaft 102. The side on which the member to be detected travels when the motor drive device applies the phase-B preceding drive waveform to the stepping motor 101 to rotate the motor clockwise is the side on which the High level is output to serve as the reset signals. The side on which the member to be detected travels when the motor drive device applies the phase-A preceding drive waveform to the stepping motor 101 to rotate the motor counterclockwise is the side on which the Low level is output to serve as the reset signals. The determination process in step S702 is performed in order to determine the absolute position by detecting the position where the reset signals change.

If the reset signals are Low level in step S702, the process proceeds to step S703, and the CPU 111 instructs the OPEN driving count unit 309 (FIG. 3) to generate a driving wave of the phase-B preceding waveform to control the motor to rotate. In contrast, if the reset signals are High level in step S702, the process proceeds to step S704, where the CPU 111 instructs the OPEN driving count unit 309 to generate a drive wave of the phase-A preceding waveform to control the motor to rotate. The process proceeds to step S705 after step S703 or S704.

In step S705, the CPU 111 determines whether or not the state of the reset signals has changed. The CPU 111 monitors the reset signals. If the state of the reset signals has changed, the process proceeds to step S706. If not, the CPU 111 continues monitoring and the determination process in step S705 is repeated.

In step S706, the CPU 111 outputs a command to stop the progress of the drive waveform to the OPEN driving count unit 309. The stop position at this time serves as the reference position for the position count. In the next step S707, the value of the register that performs final position management of the detection position is initialized, and the process of writing "0" to Epos is performed.

In the subsequent step S708, a process that writes, as STC_OFS, a value acquired by subtracting the value of the lower 10 bits of Epos from the phase count value of the drive waveform held by the drive waveform phase determining unit 308 in the state in which the rotor stops is executed. The value of STC_OFS set by the CPU 111 through the steady phase difference setting unit 310 is a value for preventing the output phase of the drive waveform from deviating at the moment when the position-linked function is turned on. At the point in time of step S708, as a result for the OPEN driving waveform, the rotor magnet 120 stably stops in accordance with a state in which a given drive waveform phase is output. The drive waveform phase after the position-linked driving is set to ON is generated based on the value of the lower 10 bits of Epos. Immediately after the position-linked driving is set to ON, the value of STC_OFS is added to the value of the lower 10 bits of Epos. Since the value after the addition is output as the phase count value of the drive waveform, it is guaranteed that the phase count value of the drive waveform does not change before and after the position-linked driving is set to ON and OFF. Next, the process proceeds to step S709.

In step S709, the CPU 111 sets the position-linked driving to ON. At this time, it is assumed that "0" is set to the offset PHS_OFS. As described above, immediately after setting the position-linked driving to ON, the output phase of the drive waveform does not change. In step S710 in FIG. 9, a rotary torque generating operation using the position-linked function is performed, and a torque generating process in the clockwise direction is executed. Specifically, the value of 256 corresponding to 90 degrees in the drive waveform phase is set to PHS_OFS. The phenomenon occurring in the motor at this time will be described below with reference to FIGS. 10 to 12.

In step S711, the CPU 111 determines whether the detection position of the rotor is equal to or exceeds the deceleration start position. After examining the drive characteristics of the motor and the mechanical unit in advance, the deceleration start position is set at a position before the target stop position by necessary rotation amounts so as to obtain a sufficient deceleration effect when a desired deceleration torque is applied. If the detection position of the rotor is equal to or exceeds the deceleration start position, the process proceeds to step S712. If the detection position of the rotor has not reached the deceleration start position, the determination process of step 711 is repeated.

In step S712, a torque generating process in the counterclockwise direction is executed. The value of −256 is set to PHS_OFS so that a counterclockwise rotary torque is applied to the motor, in other words, a decelerating torque is applied during rotation clockwise. Details thereof will be described below with reference to FIGS. 13 and 14. In step S713, the CPU 111 determines whether the detection position count value, in other words, the detected position of the rotor is equal to or exceeds the deceleration end position. After examining the drive characteristics of the motor and the mechanical unit in advance, the deceleration end position is set to a position before the target stop position so that the rotor can reach the target reach position due to inertia with sufficient deceleration and after the completion of deceleration. If the detected position of the rotor is equal to or exceeds the deceleration end position, the process proceeds to step S714. If the detected position of the rotor has not reached the deceleration end position, the CPU 111 continues monitoring and the determination process in step S713 is repeated.

In step S714, the CPU 111 performs a torque generation process in the counterclockwise direction. Specifically, "0" is set to PHS_OFS. In the next step S715, the CPU 111 determines whether the value of the detection position count, in other words, the detected position of the rotor, is equal to or exceeds the target stop position. If it is determined that the detected position of the rotor has reached the target stop position, the process proceeds to step S716. Additionally, if it is determined in step S715 that the detected position of the rotor has not reached the target stop position, the CPU continues monitoring and the determination process in step S715 is repeated. In step S716, the CPU 111 sets the position-linked driving to OFF and fixes the phase of the drive waveform. As a result, the motor stops rotation driving and the drive sequence ends.

Figure 10:
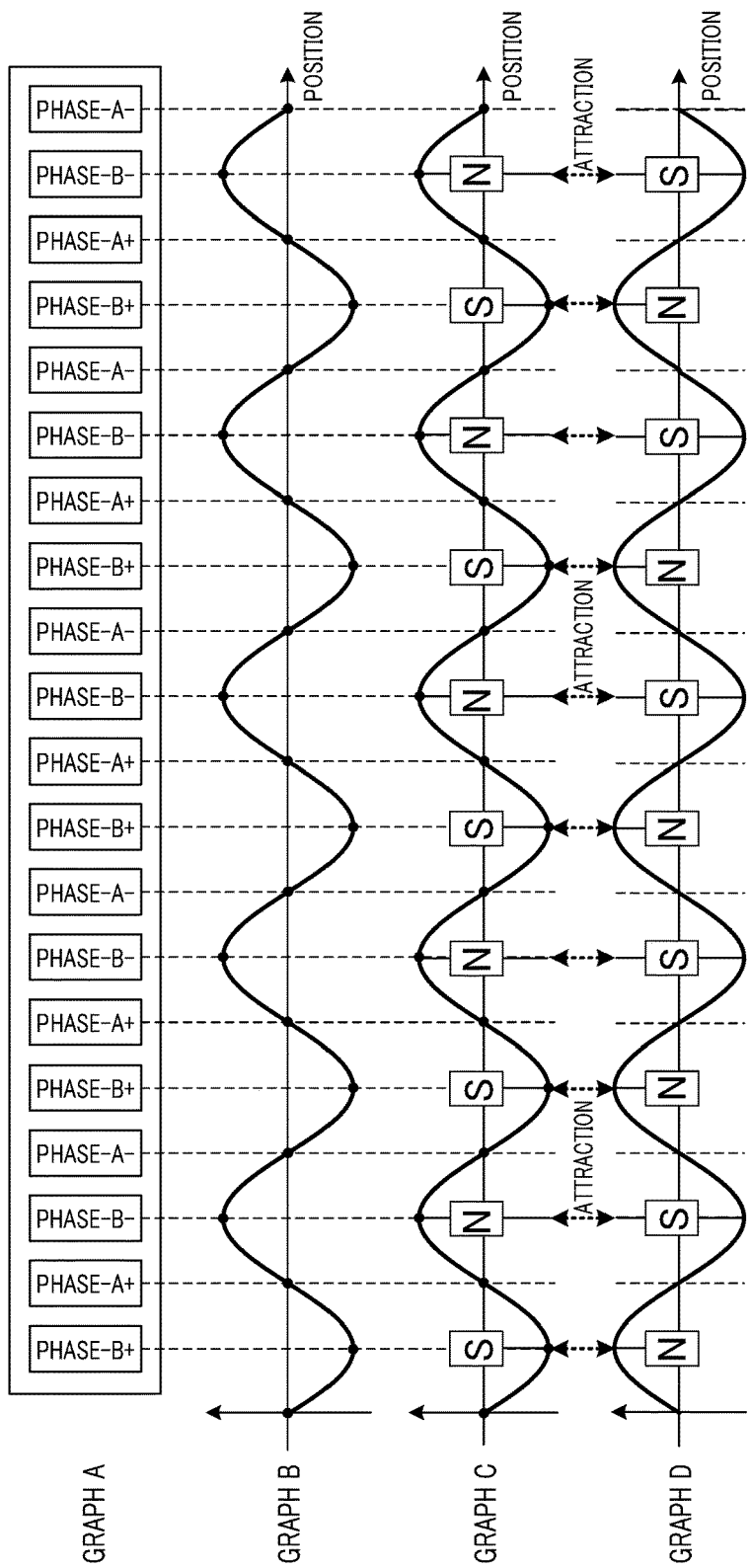
FIG. 10 is a diagram illustrating a state in which a rotor magnet phase and a drive waveform phase are stably stopped.

Next, with reference to FIG. 10 to FIG. 12, the processes in steps S709 and S710 will be described in detail. The graph A in FIG. 10 is a schematic diagram in the case in which the arrangement of the stator groups shown in FIG. 2C are aligned in one horizontal row. The graph B in FIG. 10 schematically illustrates how voltage is applied to the stator groups in the circumferential direction of the motor. The graph C in FIG. 10 illustrates the strength of the magnetic field corresponding to the position in the circumferential direction generated by the stator group by application of the voltage. The graph D in FIG. 10 illustrates the magnetization phase of the rotor magnet 120 shown in FIG. 2C. From the graph B to the graph D in FIG. 10, the horizontal axis represents the position.

FIG. 10 illustrates the state in step S709 in FIG. 8. At this time, the NS magnetic pole phase of the magnetic field generated by the stator groups and the NS magnetic pole phase of the rotor magnet 120 stably stop due to an attractive force between each other. In contrast, FIG. 11 illustrates a state in which 256 is set to PHS_OFS in step S710 in FIG. 9. The graphs A to D in FIG. 11 respectively correspond to the graphs A to D in FIG. 10. FIG. 11 illustrates that the magnetic field generated by the stator group advances by 90 degrees compared with the state shown in FIG. 10. As a result, an attractive force drawn to the right side, that is, a clockwise rotary torque (normal rotation torque), is generated in the rotor magnet 120 shown in FIG. 11D. The motion similar to this will be described with reference to FIG. 12. The horizontal axis of each graph shown in the graph A to the graph G in FIG. 12 is time axis.

Figure 12:
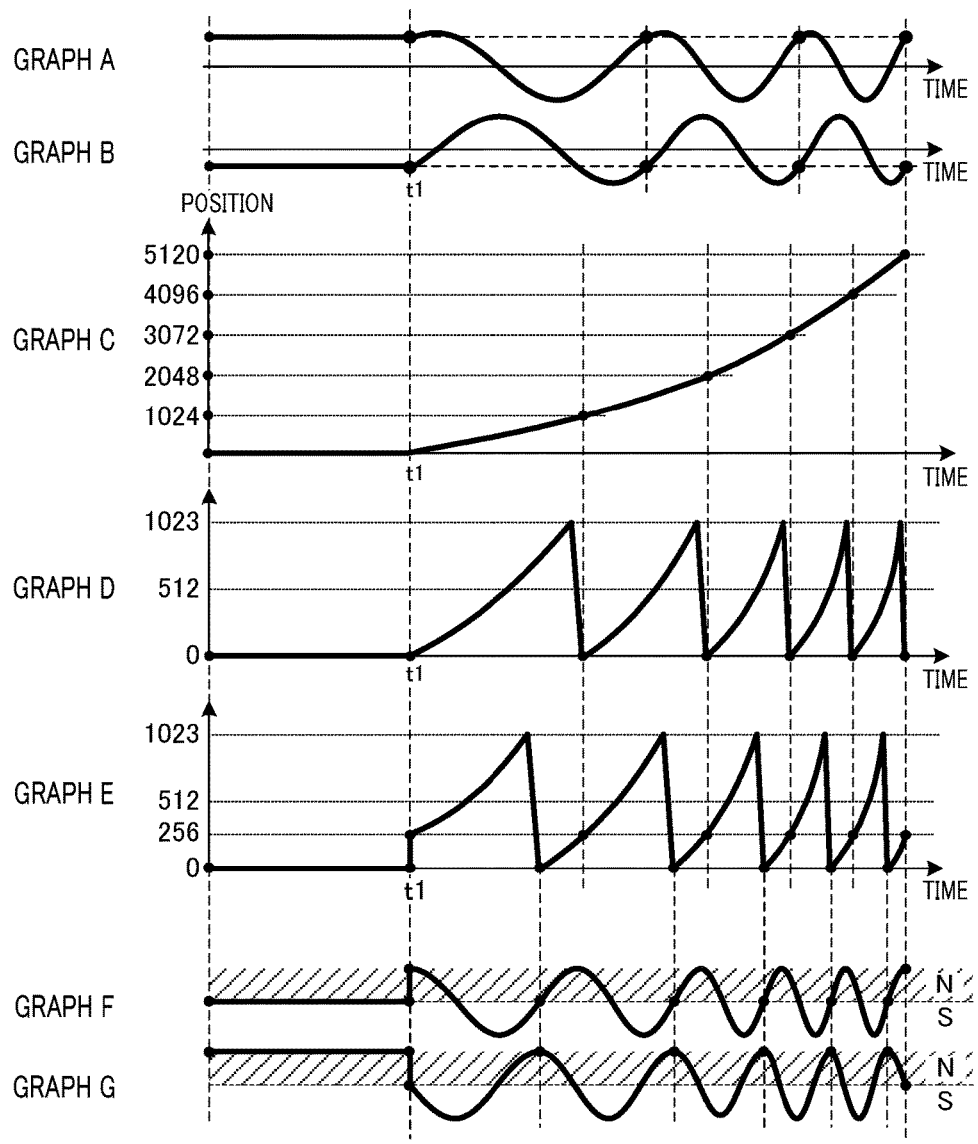
FIG. 12 is a diagram illustrating an action of the motor during acceleration.

The graph A and the graph B in FIG. 12 each illustrate a change over time of the detected position signals that have been output from the Hall sensors and adjusted. The graph C in FIG. 12 illustrates the action of Epos and the graph D in FIG. 12 illustrates the change in the value of the lower 10 bits of Epos. The graph E in FIG. 12 illustrates the behavior of the phase count value of the drive waveform. The graph F and the graph G in FIG. 12 each illustrate the change in the magnetic field generated in the stator based on the phase count value of the drive waveform. The graph F in FIG. 12 illustrates the drive waveform magnetic field generated in the stator A+ 116, and the graph G in FIG. 12 illustrates the drive waveform magnetic field generated in the stator B+ 118.

At time t1 shown in FIG. 12, assuming that 256 is set to PHS_OFS, a clockwise torque is generated at that moment and the rotor rotates. With the rotation of the rotor, the value of Epos indicating the detected position of the rotor advances, and accordingly, the phase count value of the drive waveform also advances. Due to this loop process, the phase difference between the two waveforms shown in the graph C and the graph D in FIG. 11 is always maintained so as to continuously apply a fixed rotary torque to the rotor. As a result, the rotor is accelerated to increase the rotational speed of the motor.

Figure 11:
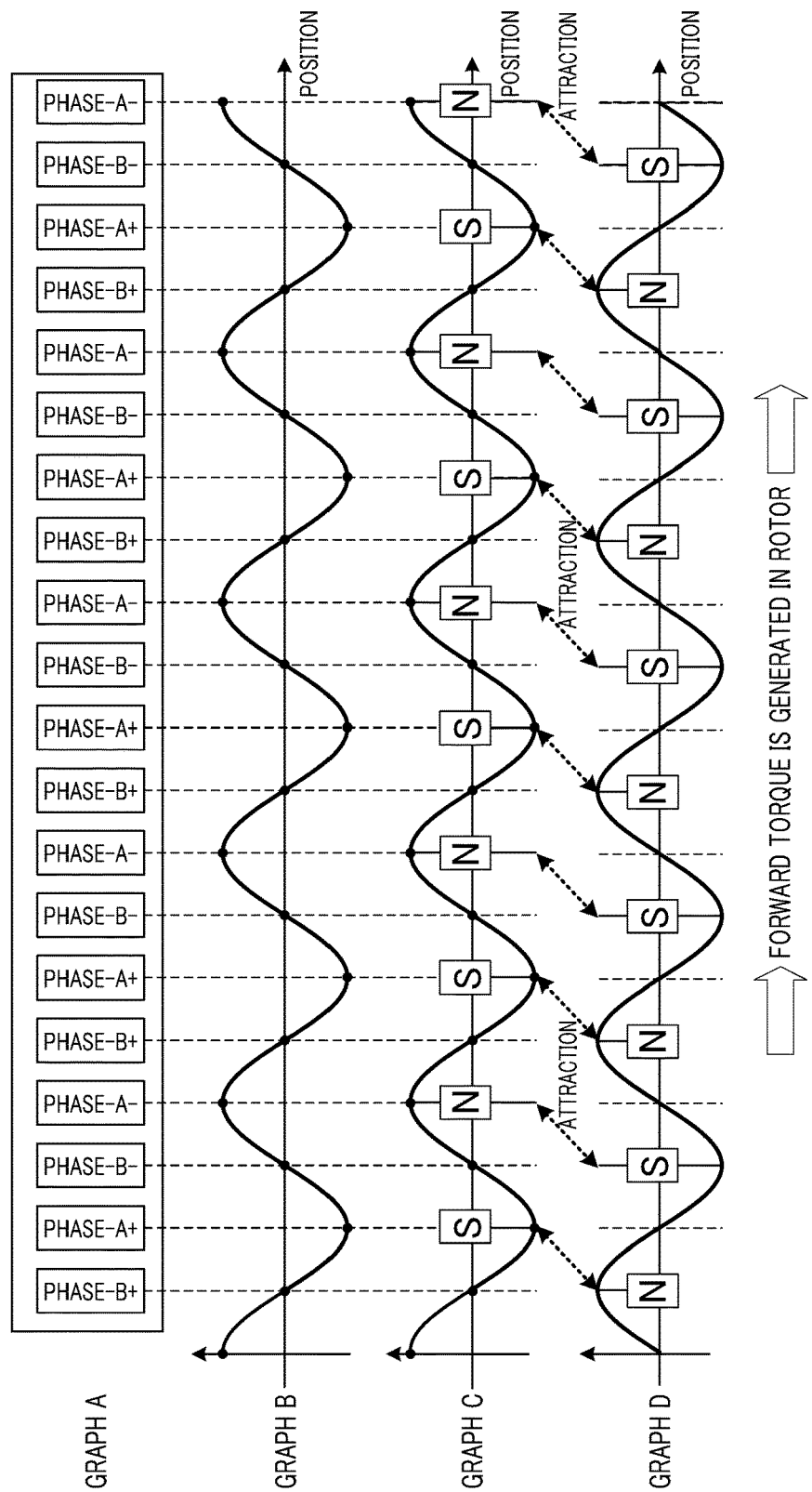
FIG. 11 is a diagram illustrating a state in which the rotor magnet phase and the drive waveform phase generate a clockwise torque.
Figure 13:
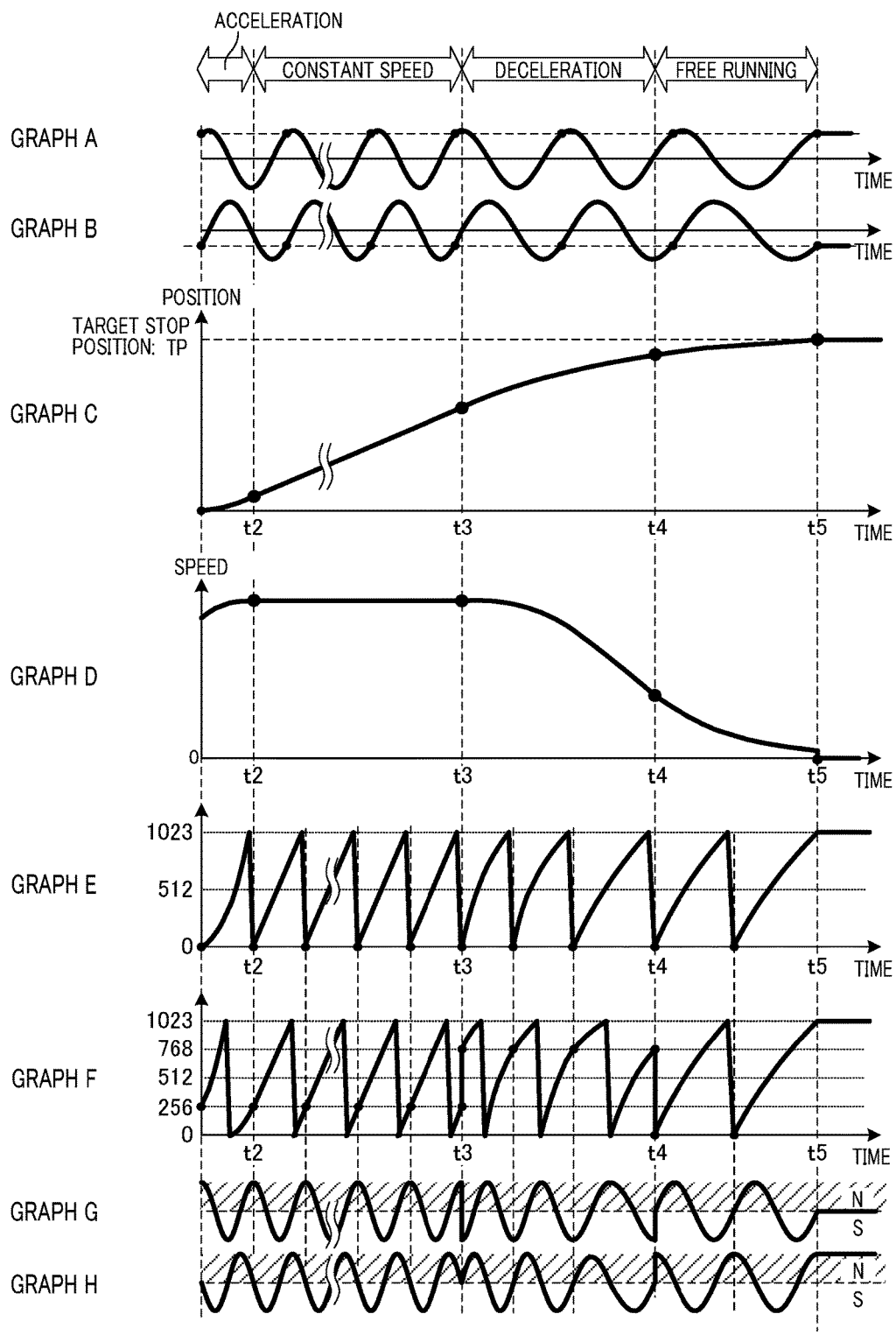
FIG. 13 is a diagram illustrating an action of the motor at a steady speed and the action of the motor when the motor decelerates and stops.

FIG. 13 illustrates an action of the motor after the operation described in FIGS. 11 and 12. A description will be given of a change in the state of the motor in which the rotor shifts to a constant speed after the acceleration of the rotor and transitions to idling along with the deceleration of the rotor. The graph A and the graph B in FIG. 13 each illustrate the change in time of the detection position signals that have been output from the Hall sensors and adjusted. The graph C in FIG. 13 illustrates the behavior of Epos, and the graph D in FIG. 13 illustrates the behavior of the rotation number (rotation speed). The graph E in FIG. 13 illustrates the value of lower 10 bits of Epos and the graph F in FIG. 13 illustrates the behavior of the phase count value of the drive waveform. Additionally, the graph G and the graph H in FIG. 13 each illustrate the drive waveform magnetic field generated in the stator A+ 116 and the drive waveform magnetic field generated in the stator B+ 118 based on the phase count value of the drive waveform.

The motor continues acceleration up to time t2 in FIG. 13 and transitions to a constant speed up to time t3. The generated torque having the principle that has been described with reference to FIG. 11 is attenuated due to the delay caused by the frequency characteristics of the coil when converted from the voltage to the current as the rotation speed increases, and the influence of the counter electromotive force increases. Hence, the generated torque, the counter electromotive force, and the mechanical load are balanced at a given rotation number, and thereby the rotating speed of the rotor becomes constant.

Figure 14:
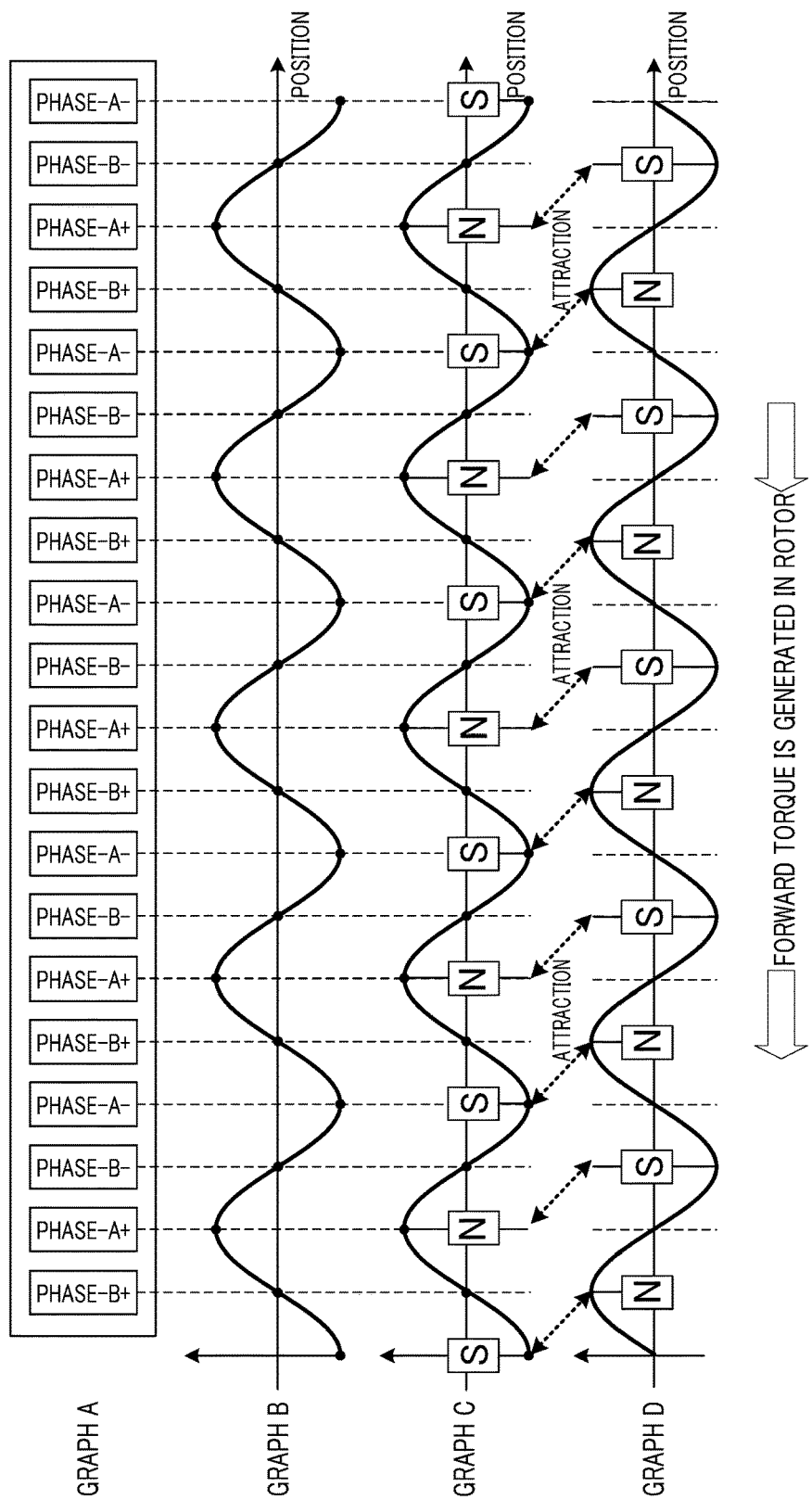
FIG. 14 is a diagram illustrating a state in which that the rotor magnet phase and the drive waveform phase generate a counterclockwise torque.

The rotor is decelerated during a period of time from time t3 to time t4 in FIG. 13. With reference to FIG. 14, the state of step S712 in FIG. 9 will be described. FIG. 14 basically corresponds to FIG. 10 and FIG. 11. In this state, the phase of the magnetic field generated by the stator groups is delayed by 90 degrees as compared with the stable stop state shown in FIG. 10. Accordingly, an attractive force pulling the rotor magnet 120 shown in the graph D in FIG. 14 toward the left, in other words, a counterclockwise rotary torque, is generated. Specifically, the speed can be smoothly reduced by utilizing the reverse rotary torque to serve as a brake torque. Note that the action at time t3 in FIG. 13 corresponds to the action in step S712 in FIG. 9. At the timing of time t3, the phase count value of the drive waveform shown in the graph F in FIG. 13 transitions from a state of being advanced by 256 counts to a state of being delayed by 236 counts with respect to the value of lower 10 bits of Epos shown in the graph E in FIG. 13.

The process that sets zero to PHS_OFS is performed in step S714 in FIG. 9, wherein this state corresponds to the state at time t4 in FIG. 13. At this timing, the drive waveform phase count value shown in the graph F in FIG. 13 transitions to a value having no difference with respect to the value of lower 10 bits of Epos shown in the graph E in FIG. 13. If the detected position has reached the target stop position (FIG. 13(C): TP) in the subsequent step S715, the process proceeds to step S716. This timing corresponds to time t5 in FIG. 13.

According to the present embodiment, it is possible to generate a drive waveform with less response delay in a process that generates an efficient drive waveform for the motor based on the detected position of the rotor that is detected by the rotational position detecting unit.

Second Embodiment

Next, a second embodiment will be described with reference to FIGS. 15 and 16. In the present embodiment, a configuration and a process that performs follow-up control on the target speed will be described based on the value to be set to the offset PHS_OFS. In the present embodiment, the detailed description of the configuration and operations that are similar to those in the first embodiment will be omitted, and mainly the differences will be described.

Figure 15:
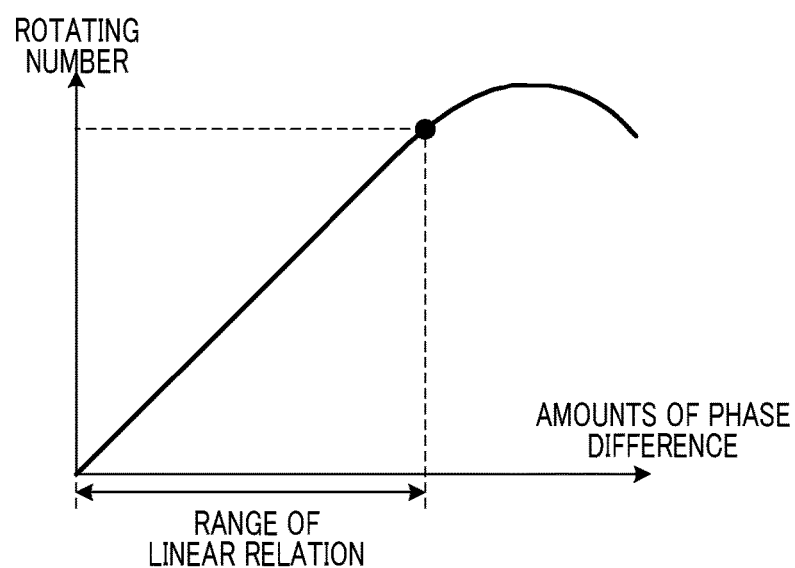
FIG. 15 is a diagram illustrating the relation between the phase difference between the rotor magnet phase and the drive waveform and the rotating number at a steady speed.

FIG. 15 illustrates the relation between amounts of the phase difference to be set to PHS_OFS between the detection position count and the drive waveform and the steady rotational speed of the motor. The horizontal axis represents the amounts of phase difference and the vertical axis represents the rotation number. The graph in FIG. 15 illustrates the characteristics in which the rotation number increases with sharpness as the amount of phase difference increases. According to the characteristics, in the range of linear relation, the rotation number increases in proportion to the amounts of the phase difference. However, if the amounts of the phase difference increase beyond the linear relation range, the rotation number reaches a plateau (the maximum rotation speed), and subsequently the rotation number decreases. As in the range of linear relation in the drawing, within the range where the relation between the phase difference and the rotation number can be regarded as a linear relation, general speed control is possible by using the amounts of phase difference as the amounts of control. With reference to the flowchart in FIG. 16, the drive sequence will be specifically described. Since the process executed in the first half of the drive sequence is similar to the process in steps S701 to S710 in FIG. 8 and FIG. 9, the description thereof will be omitted. In step S710, after an acceleration torque is applied to the rotor to start the rotational motion, the process proceeds to step S1411 in FIG. 16.

In step S1411, the CPU 111 calculates the detection speed value by using differentiation calculation of the detection position count value, filter process, and the like. A difference value in speed between the calculated detection speed value and a preset target speed is calculated. The CPU 111 is designed to function as a control unit that performs control with the object of following the target speed with a speed difference value serving as a deviation amount. Specifically, the CPU 111 realizes the function of the control unit by executing a predetermined program, calculates amounts for controlling the phase difference based on the deviation amount, and performs a speed following process. As such a control unit, there is a general P (proportional) I (integral) D (differential) control unit, and a control unit by using, for example, a phase compensation filter. In addition, a control unit based on advanced control theory, which is outside of classical control theory, may be used. Note that the present invention is applicable to a motor drive device in which, instead of the CPU 11, a control unit designed in advance is installed as hardware.

In step S1412, the CPU 111 determines whether the detected position of the rotor is equal to or exceeds the deceleration start position. If the detected position of the rotor is equal to or exceeds the deceleration start position, the process proceeds to step S1413. In contrast, if the detected position of the rotor has not reached the deceleration start position, the process returns to step S1411 to continue the speed control process.

Figure 16:
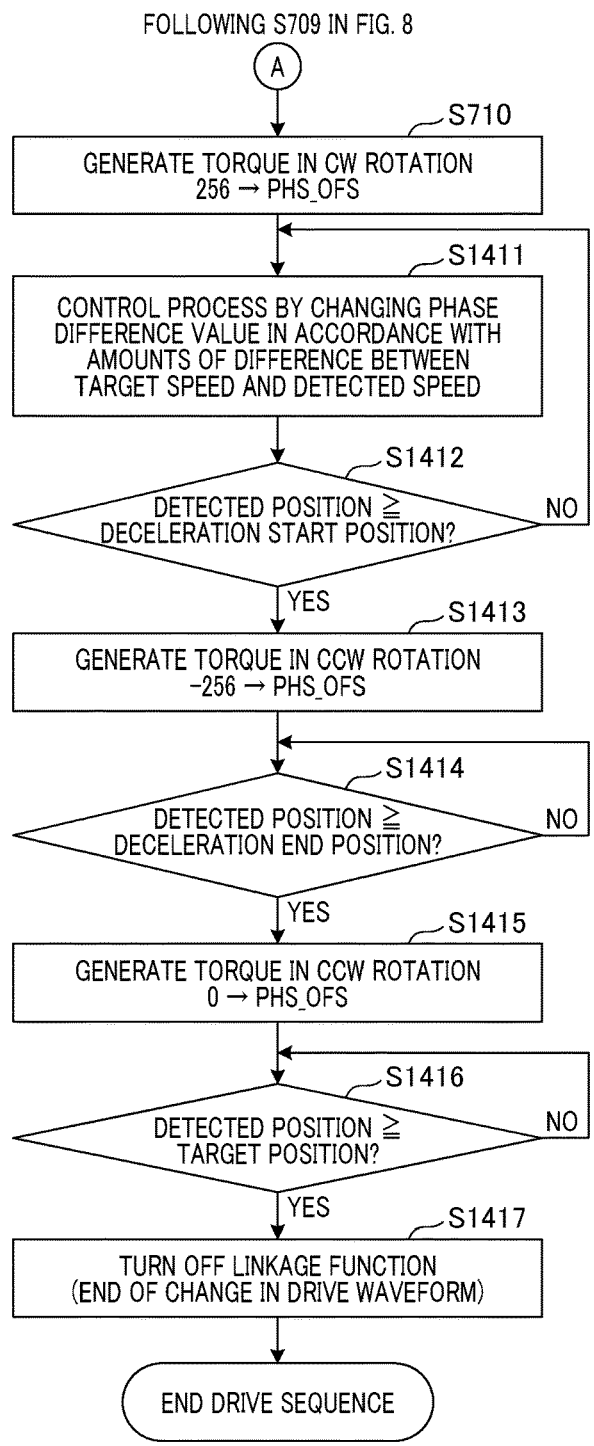
FIG. 16 is a flowchart illustrating a process according to a second embodiment.

After that, the processes from steps S1413 to S1417 in FIG. 16 are similar to those in step S712 to S716 described in FIG. 9 in the first embodiment, so the detailed description thereof will be omitted. Additionally, in the present embodiment, the process that sets the driving phase difference via the phase difference setting unit has been described by using data showing the relation between the amounts of phase difference and the steady rotation speed of the motor. The present invention is not limited thereto, and a process that sets the driving phase difference via the phase difference setting unit may be performed by using data showing the relation between the amounts of phase difference and the generated torque. In this case, data showing the relation between the amounts of phase difference between the detection position count set to PHS_OFS and the drive waveform, and the torque generated by the motor are stored in the memory in advance, and the CPU 111 sets the amounts of phase difference corresponding to a desired generated torque.

According to the present embodiment, in addition to the effect of the first embodiment, the speed can be controlled with the phase difference amount serving as the control amount depending on the amounts of differences between the target speed and the detection speed of the motor. The embodiment described above can realize a motor drive device that can efficiently generate a drive waveform with less response delay to the motor based on the detection position of the rotation of the rotor. Although the position detecting unit of the above embodiment has a configuration using a plurality of Hall sensors and rotary magnets, other sensor mechanisms can be used as long as the rotational position can be detected with sufficiently high precision. Additionally, the above-described embodiment has been described assuming that the general configuration of a ten pole claw pole type stepping motor is adopted. However, the present invention is not limited thereto. Other motors may be used if a permanent magnet is used at the rotor side and a coil/stator is used at the stator side. The rotary magnet (six pole magnet) for detecting position is an example, and a magnet with any number of poles can be used as a magnet for position detection by changing the setting values of the setting units 303, 305, 310, and 311 shown in FIG. 3.

Third Embodiment

As in the first and second embodiments, generating a drive waveform based on the position detection signals may decrease the stop precision depending on the resolution (detection cycle) of the position detection signals. Accordingly, in the present embodiment, an example will be described in which a decrease in the stop precision is reduced in a motor drive device that generates a drive waveform based on the position detection signals. The present embodiment will describe only a relation between a sine-wave position count value and a PWM value (value of duty %) to be output that differs from the first embodiment, with reference to FIG. 7. In FIG. 7, the value of duty % on the vertical axis increases or decreases in accordance with the gain value set by a synchronous control unit 201 or an asynchronous control unit 203. In the present embodiment, it is assumed that an appropriate value that does not interfere with the rotational motion of the motor, is set. Additionally, performing the synchronous control by using the synchronous control unit 201 can lead to generate an efficient drive waveform with less response delay to the stepping motor based on the rotational position detected by the rotational position detecting mechanism. However, in synchronous control, the resolution of the count value of the drive waveform phase is determined depending on the resolution of the position detection signals. Hence, for example, if the resolution of the position detection signals is lower than the resolution of the drive waveform, a count value of the drive waveform phase may not attain an effective resolution.

Figure 17:
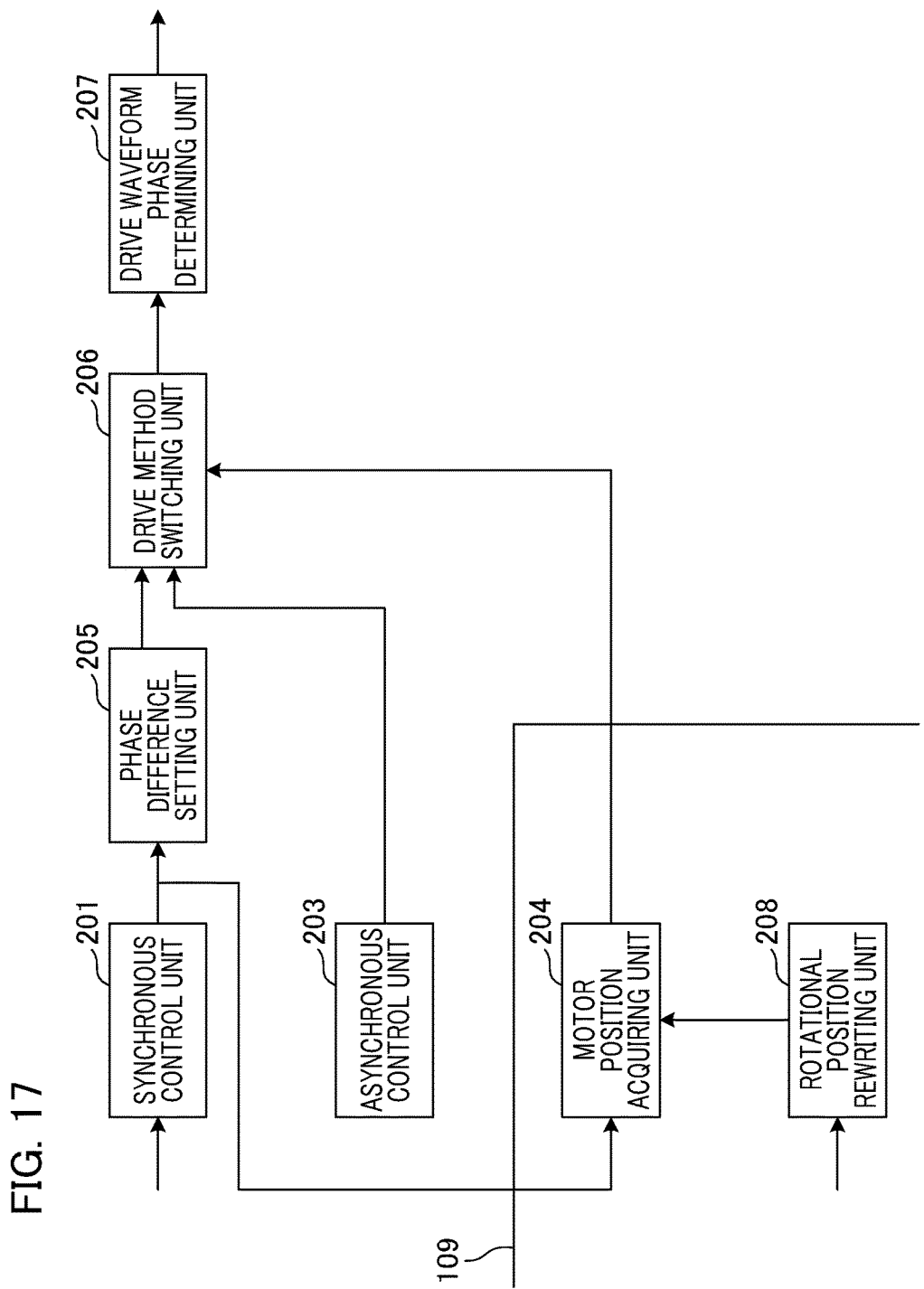
FIG. 17 is a block diagram illustrating a configuration of the drive waveform generating circuit according to a third embodiment.

FIG. 17 illustrates an internal configuration of the drive waveform generating circuit 110. The drive waveform generating circuit 110 includes a synchronous control unit 201, a phase difference setting unit 205, the asynchronous control unit 203, a drive method switching unit 206, and a drive waveform phase determining unit 207. Additionally, in synchronous control to be described below, a motor position acquiring unit 204 provided in the position ENC circuit outputs the number of rotations of the rotor of the motor to the drive method switching unit 206.

The drive waveform generating circuit 110 has two control units, the synchronous control unit 201 and the asynchronous control unit 203, and switches between the two control units to generate a drive waveform by using the drive method switching unit 206. As a result, it is possible to switch between synchronous control and asynchronous control.

The synchronous control unit 201 is a control unit that performs synchronous control by which a driving sine-wave signal is generated based on the rotational position information output from the position ENC circuit 109. Specifically, a process is performed in which the rotational position information generated by the position ENC circuit 109 is converted into a value corresponding to a rotational position count detected when the motor rotates once. For example, if the position count precision for one rotation of the encoder is 12 bit precision and the rotational position count precision for one rotation of the motor is 10 bit precision, the upper 10 bits of the position count precision of the encoder are treated as the position count of the motor, so that 12 bits are converted into 10 bits. Counting the rotational position count value acquired by this conversion process can reveal that how many times the rotor has rotated.

The asynchronous control unit 203 is a control unit that performs asynchronous control for generating driving sine-wave signals based on the frequency that has been set by the CPU 111. This control is asynchronous with the position ENC circuit 109. In this control, the CPU 111 commands the frequency of the drive waveform, sets an amplitude gain of the drive waveform, and outputs the drive waveform with the desired amplitude.

The phase difference setting unit 205 is a unit that sets the phase difference between the rotational position of the motor and the drive waveform, and adds and subtracts the offset value that has been set with respect to the rotational position count information of the motor generated by the synchronous control unit 201. This value serves as a count value of the drive waveform phase, and the output value of the phase corresponding to this count value is selected as an output value of the drive waveform.

The motor position acquiring unit 204 receives the rotational position count of the motor, which has been generated by the synchronous control unit 201, and acquires the number of rotations of the rotor. The motor position acquiring unit 204 monitors the state of change of the information about the rotational position count of the motor, performs addition and subtraction based on the information about the rotation, and counts the rotating number of the motor. The information about the position of the motor acquired by counting is held and output to the drive method switching unit 206.

The drive method switching unit 206 switches between the synchronous control unit 201 and asynchronous control unit 203, which are used for control. This switching can be performed, for example, by a command from the CPU 111.

The drive waveform phase determining unit 207 has a table in which the rotational position information for the motor and the sine-wave value are associated, determines the phase count information of the drive waveform, and transmits a PWM command value corresponding to the determined phase count to the PWM generating unit 112. The PWM generating unit 112 outputs PWM signals to the motor driver 113 in accordance with the received PWM command value.

A rotational position rewriting unit 208 rewrites the rotational position of the motor in accordance with the instruction from the CPU 111. The rotational position rewriting unit 208 rewrites the rotational position of the motor with the detected position to serve as the reference position after detecting the change timing of the signals from the reset mechanism 121 during reset operation by the reset mechanism 121. Additionally, the rotational position rewriting unit 208 may rewrite the rotational position other than the timing of changing the signals from the reset mechanism 121. For example, if there is a difference between the drive waveform phase of the motor of the drive circuit and the rotation phase of the rotor due to step-out, the rotational position rewriting unit 208 may also be used to correct the drive waveform phase of the motor and the rotation phase of the rotor after step-out.

In the present embodiment, it is assumed that the resolution of the position detection signals is determined depending on the A/D conversion cycle of the position detection signals by using the A/D conversion circuit. FIG. 18 illustrates a relation between the sine-wave drive waveform if the A/D conversion cycle of the A/D conversion circuit 108 is larger than the resolution of the phase count value of the drive waveform and the PWM signal based on the phase count value.

Figure 18A:
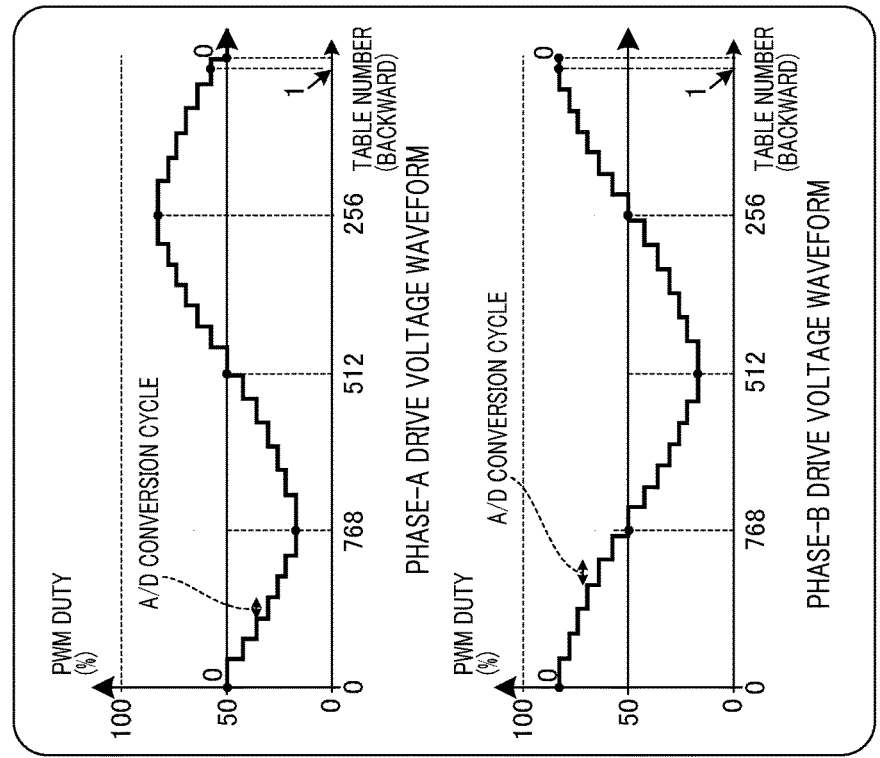
FIGS. 18A and 18B are diagrams illustrating a relation between a position count value and a PWM value if a rotational position detecting cycle is larger than a phase count resolution of the drive waveform.
Figure 18B:
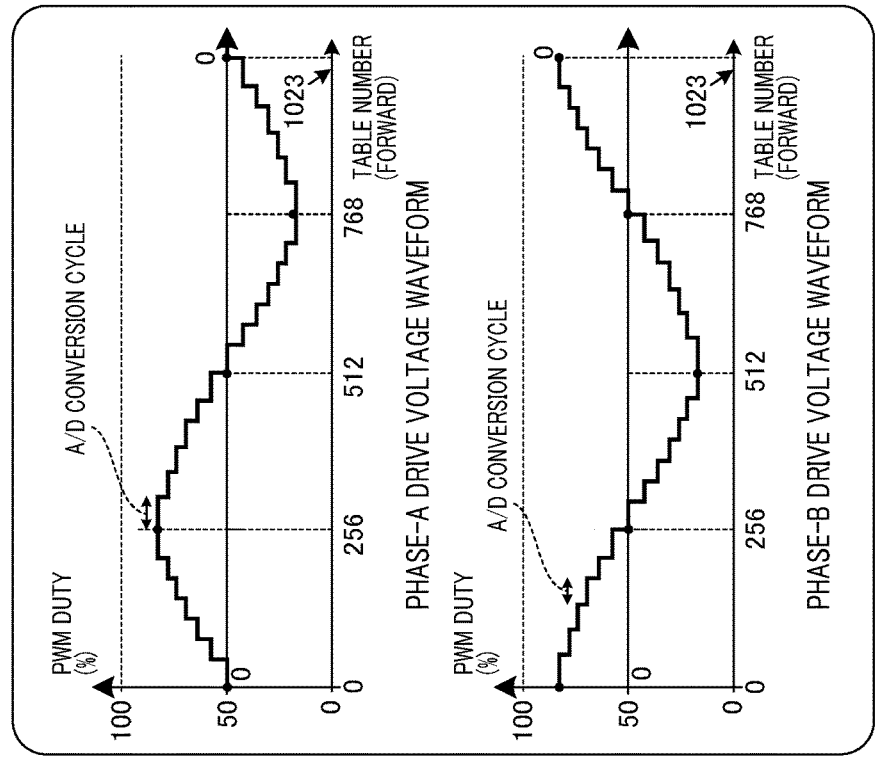

In both FIGS. 18A and 18B, the horizontal axis represents the table number and the vertical axis represents the value of duty % of the PWM signals. As described in FIG. 17, it is assumed, in the present embodiment, that the drive waveform with 1024 resolution can be controlled for one sine-wave cycle of the detection signals. In FIG. 18A, the horizontal axis is plus counted, the phase-B drive voltage waveform precedes the phase-A drive voltage waveform by 90 degrees, and the motor rotates clockwise. In FIG. 18B, the horizontal axis is minus counted, the phase-A drive voltage waveform precedes the phase-B drive voltage waveform by 90 degrees, and the motor rotates counterclockwise. The % value on the vertical axis increases and decreases in accordance with the gain value set by the synchronous control unit 201 or the asynchronous control unit 203. However, in the present embodiment, a case is assumed in which an appropriate value that does not interfere with the rotational motion of the motor is set. In the present embodiment, a case is assumed in which the A/D conversion cycle is ⅟26 of the cycle of the drive waveform. FIG. 17 illustrates that the drive waveform is controlled with the phase count resolution, while FIG. 18 illustrates that the drive waveform is controlled with the cycle of the A/D conversion. Thus, the sine-wave drive waveform is limited depending on the cycle of the A/D conversion and changes stepwise.

Here, in stopping the motor, the motor needs to be stopped at the target stop position without deviation with a precision of the phase count resolution. However, as shown in FIG. 5, if the A/D conversion cycle is not sufficiently shorter than the phase count resolution of the drive waveform, stopping with the precision is difficult. For example, if the A/D conversion cycle is ⅟26 of the cycle of the drive waveform, the change in phase count within the A/D conversion cycle is 1024÷26≈39.4 count.

The influence due to this drawback can be reduced by stopping the motor after decelerating the motor until the A/D conversion cycle of the A/D conversion circuit 108 becomes sufficiently shorter than the phase count resolution of the drive waveform. However, in that case, an inconvenience of taking a long time for the motor to stop occurs. Additionally, it is also conceivable to shorten the conversion cycle of the A/D conversion circuit 108. However, using an A/D conversion circuit having more than necessary conversion cycles for detection of the original position, in order to control the synchronous control unit 201, causes an increase in circuit size and cost. Additionally, even if the conversion cycle of A/D conversion becomes sufficient, a slight phase count error occurs due to noise and precision during AD conversion when the motor stops, and there is a concern that consequently the error may cause a deviation in the stop position.

Accordingly, in controlling the synchronous control unit 201, the stop precision of the motor is limited due to the interval of position detection. As in the present embodiment, if the interval of position detection is determined depending on the interval of A/D conversion converted by the A/D conversion circuit 108, the precision in the stopping of the motor is determined depending on the performance of the A/D conversion by the A/D conversion circuit 108. Hence, if the A/D conversion cycle is not sufficiently shorter than the phase count resolution of the drive waveform (as shown in FIG. 18), the precision in the stopping of the motor is sometimes lower than a case in which the A/D conversion cycle is sufficiently shorter than the phase count resolution of the drive waveform.

Accordingly, in the present embodiment, the synchronous control performed by the synchronous control unit 201 and the asynchronous control performed by the asynchronous control unit 203 are preferably switched. As a result, even if the A/D conversion cycle is not sufficiently shorter than the phase count resolution of the drive waveform, the lowering of the precision in the stopping of the drive device that drives the stepping motor is reduced by using the sine-wave position detection signals and the drive voltage.

Figure 19:
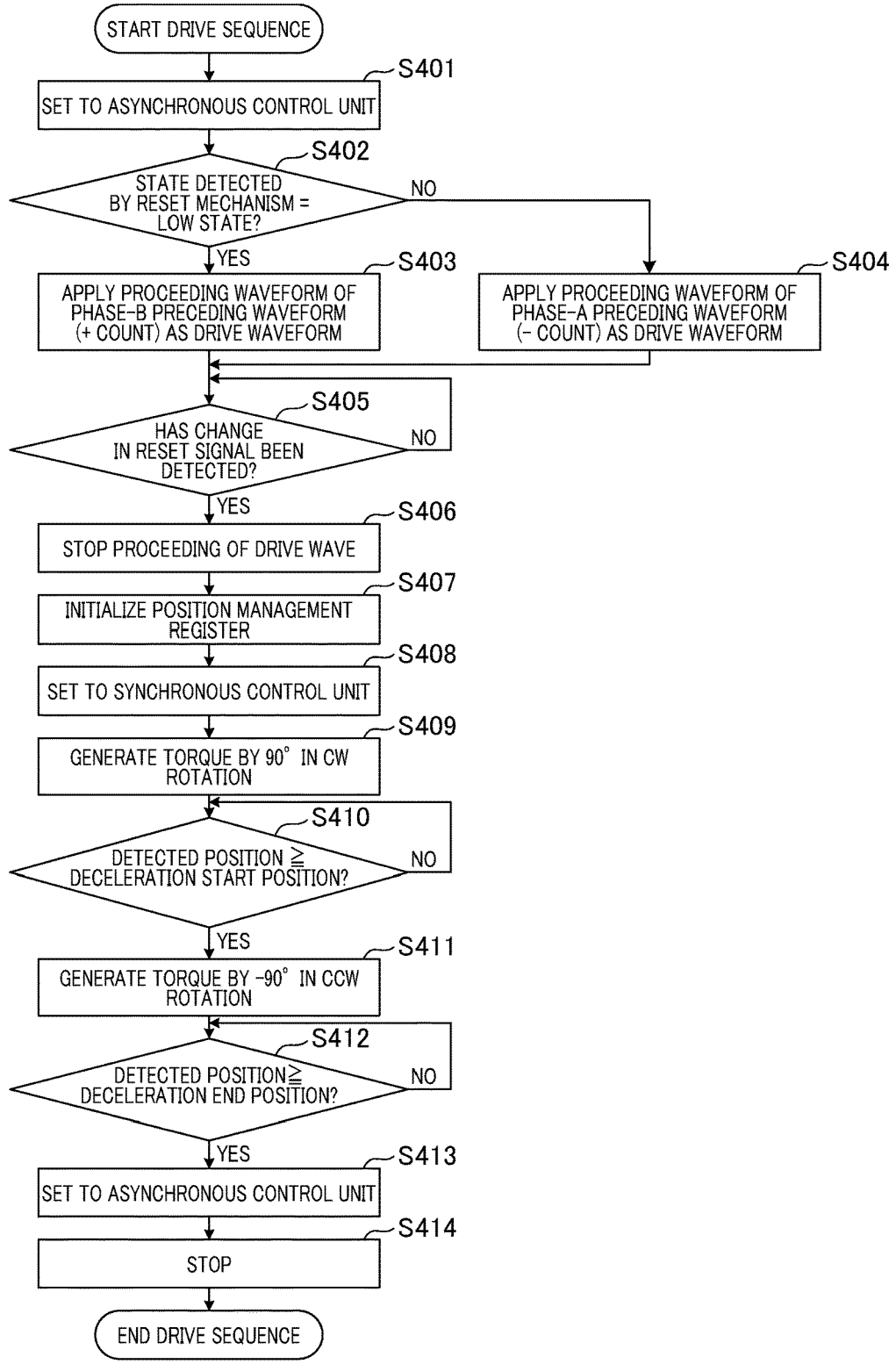
FIG. 19 is a flowchart illustrating a flow of the process in the third embodiment.

FIG. 19 is a flowchart illustrating a flow of the process in the present embodiment. The CPU 111 performs control shown in FIG. 19 to be described below in accordance with a predetermined program. Note that steps S402 and S405 in FIG. 19 are similar to the processes in steps S702 and S705 in FIG. 8, and thus description thereof will be omitted.

When the drive sequence starts, the process proceeds to step S401. In step S401, first, the control of the asynchronous control unit 203 is set, and specifically, asynchronous control is turned on.

If the reset signals are of low level in step S402, the process proceeds to step S403, and if the reset signals are of high level, the process proceeds to step S404. In step S403, the asynchronous control unit 203 provides instructions for generating the drive wave of the phase-B preceding waveform and carries out control to rotate the motor. In contrast, in step S404, the asynchronous control unit 203 provides instructions for generating the drive wave of the phase-A preceding waveform and carries out control to rotate the motor. After the process of steps S403 or step S404, the process proceeds to step S405.

If a change occurs in the reset signals in the subsequent step S405, the process proceeds to step S406, and the asynchronous control unit 203 provides instructions for stopping the progress of the drive waveform. The stop position at this time serves as the reference position of the position count.

In the subsequent step S407, the rotational position rewriting unit 208 performs a process that rewrites the information about rotational position of the motor held by the motor position acquiring unit 204 to the reference position. At this time, in the rotational position information of the motor, although the rotation amounts (how many times the motor has rotated) are rewritten, the information about the specific position in one rotation (hereinafter, referred to as "position information in one rotation") is not rewritten. The position information in one rotation is a signal value of a sawtooth wave that periodically changes with respect to the rotation amounts between zero and the upper limit value (0 to 360°).

In the subsequent step S408, the control of the synchronous control unit 201 is set, and specifically, the synchronization control is turned on. At this time, it is assumed that 0 is set in the phase difference setting unit 205, and the output phase of the drive waveform does not change immediately after switching the control method to the synchronous control unit 201.

In step S409, a clockwise rotary torque (normal rotation torque) generating operation using the synchronous control unit 201 is performed. Specifically, a value corresponding to 90 degrees (256 in the present embodiment) in the drive waveform phase is set to the phase difference setting unit 205.

At the moment the value is set, a clockwise torque is generated to rotate the motor. As the motor rotates, the position information of the position ENC circuit 109 advances, so that the sine-wave position count value of the synchronous control unit 201 also advances. Due to this loop process, the phase difference of the waveform is always maintained, and a fixed rotary torque continues to be applied. Accordingly, the motor speed increases with the acceleration. The accelerated motor speed transitions to a constant speed at a given timing. This is because, as the rotating number of the generated torque increases, the generated torque, the counter electromotive force, and the mechanical load are balanced with each other at a given rotating number.

In step S410, it is determined whether or not the detected position of the rotor has exceeded the deceleration start position. If it is determined that the detected position of the rotor has exceeded the deceleration start position, the process proceeds to step S411, and deceleration control starts. If it is determined that the detected position of the rotor has not reached the deceleration start position, the determination process of step S410 is repeated. The deceleration start position is set at a position before the target stop position by the rotating amounts necessary for obtaining a sufficient deceleration effect when a desired deceleration torque is applied after examining the driving characteristics of the motor and the mechanism unit in advance.

In step S411, a value (−256 in the present embodiment) corresponding to −90 degrees of the drive waveform phase is set to the phase difference setting unit 205 so as to apply a counterclockwise rotary torque to the motor, that is, a torque serving as a brake during clockwise rotation. As a result, the counterclockwise rotary torque is generated. This reverse rotary torque is used as a brake torque to achieve prompt deceleration.

In the subsequent step S412, it is determined whether or not the detected position of the rotor has exceeded the deceleration end position. If it is determined that the detected position of the rotor has exceeded the deceleration end position, the process proceeds to step S413, and the deceleration control ends. In contrast, if the detected position of the rotor has not reached the deceleration end position, the determination process in step S412 is repeated. It is assumed that the deceleration end position is set at a position before the target stop position according to a threshold. In other words, step S412 is a process that determines whether or not the difference between the detected position of the rotor and the target stop position is equal to or less than the threshold based on the detected position. The lowering of the precision in stopping can be reduced by setting this threshold to a value larger than the rotation amounts of the motor, within the detection interval of the rotational position (within the A/D conversion cycle, in the present embodiment,) during the synchronous control immediately before switching from the synchronous control to the asynchronous control in step S413. In other words, it is possible to lower the precision in stopping by setting a PWMDUTY value that differs between the target stop position and the deceleration end position if the drive waveform is stepwise as shown in FIG. 5. It is possible to use the amounts of the phase counts in a positional detection by the position detecting unit to serve as the rotation amounts of the motor.

In step S413, the control unit is switched to the control setting of the asynchronous control unit 203 to start the stop control by asynchronous control. As a result, the precision in stopping is not affected by the A/D conversion cycle.

In the subsequent step S414, the rotor is controlled at a the predetermined speed set by the CPU 111 up to the target stop position by the control performed by the asynchronous control unit 203 to fix the phase of the drive waveform at the target position. Accordingly, the motor stops driving of rotation.

By implementing the configuration and processes of the above-described embodiments, it is possible to achieve a motor drive device in which a drive waveform with less response delay with respect to the motor can be generated by the synchronization control unit and an efficient precision in stopping can be maintained by suitably switching to the asynchronous control unit when the motor stops.

Fourth Embodiment

In the present embodiment, an example of a motor drive device in which the A/D conversion cycle of the A/D conversion circuit 108 dynamically switches will be described. The present embodiment is different from the third embodiment in that it includes an A/D conversion cycle acquiring unit that acquires an A/D conversion cycle and a threshold setting unit that sets a distance between the deceleration end position and the target stop position in accordance with the A/D conversion cycle. Descriptions similar to those in the third embodiment will be omitted.

Figure 20:
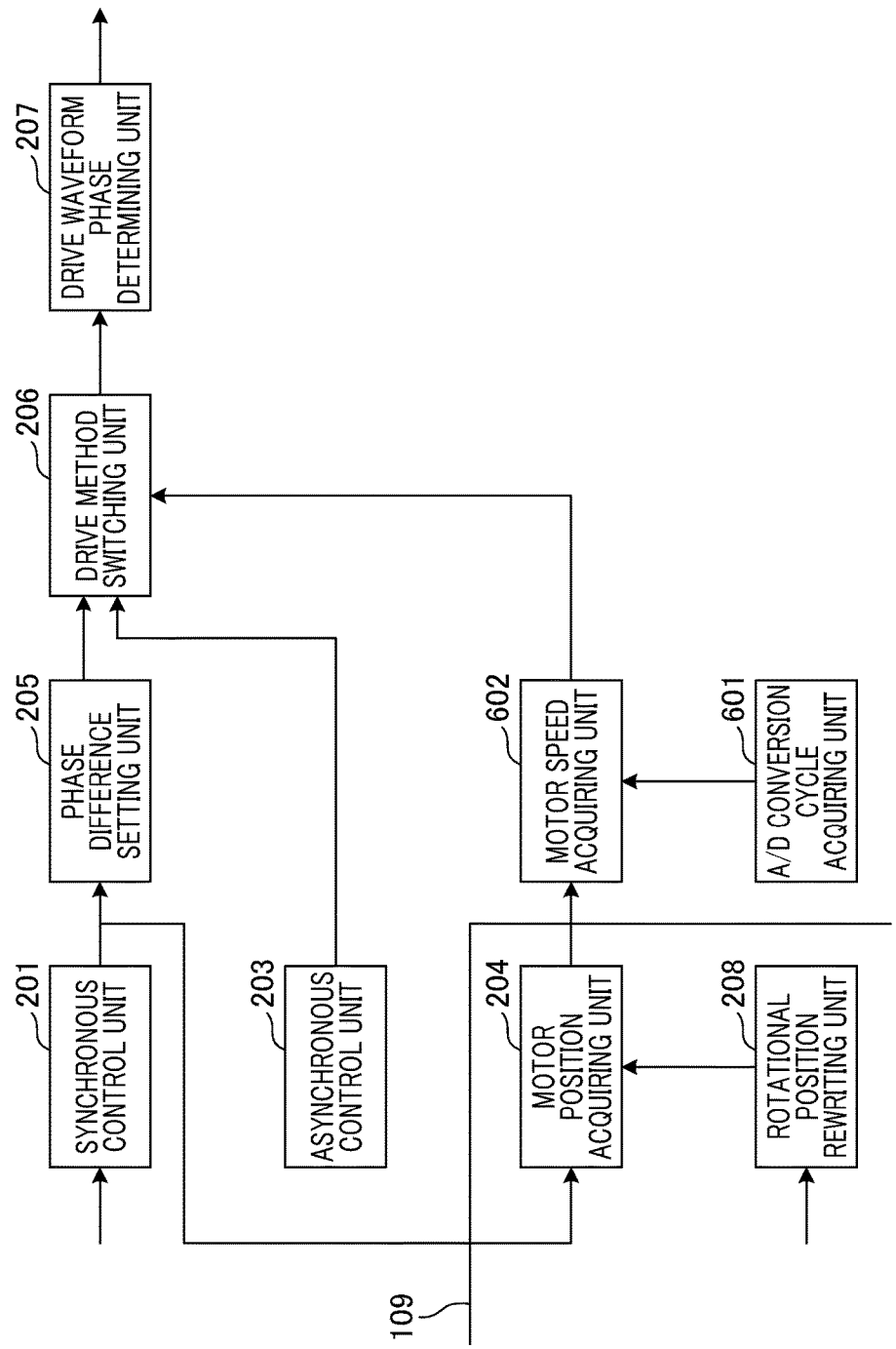
FIG. 20 is a block diagram illustrating a configuration of the drive waveform generating circuit according to a fourth embodiment.

FIG. 20 illustrates the internal configuration of the drive waveform generating circuit in the present embodiment. In addition to the drive waveform generating circuit in the third embodiment, the drive waveform generating circuit in the present embodiment includes an A/D conversion cycle acquiring unit 601 and a motor speed acquiring unit 602. Since the synchronous control unit 201 to the rotational position rewriting unit 208 are the same as those in FIG. 17, the description thereof will be omitted.

The A/D conversion cycle acquiring unit 601 is an acquiring unit that acquires information about the A/D conversion cycle of the position detection signals from the A/D conversion circuit 108. In the present embodiment, it is assumed that the AD conversion cycle can be changed within a given range by a command from the CPU 111. The A/D conversion circuit is generally used not only for acquiring the analog value by the position ENC circuit 109, but also for acquiring other analog values. A selector is prepared outside the A/D conversion circuit and performs A/D conversions in order, thereby reducing the number of A/D conversion circuits. Hence, for example, in the case of prioritizing the acquisition of an analog value, the A/D conversion cycle of the position detection signals output from the Hall element package may cause delays in the conversion cycle. The A/D conversion cycle acquiring unit 601 acquires the A/D conversion cycle with respect to the position detection signals output from this Hall element package 104.

The motor speed acquiring unit 602 is a circuit that acquires a rotation speed of the motor. The motor speed acquiring unit 602 can acquire the rotation speed of the motor to serve as amounts of change in the phase count that has advanced for period length of the rotation speed=AD conversion/AD conversion cycle by using the position information output from the motor position acquiring unit 204 and the A/D conversion by the AD conversion cycle acquiring unit 601.

Figure 21:
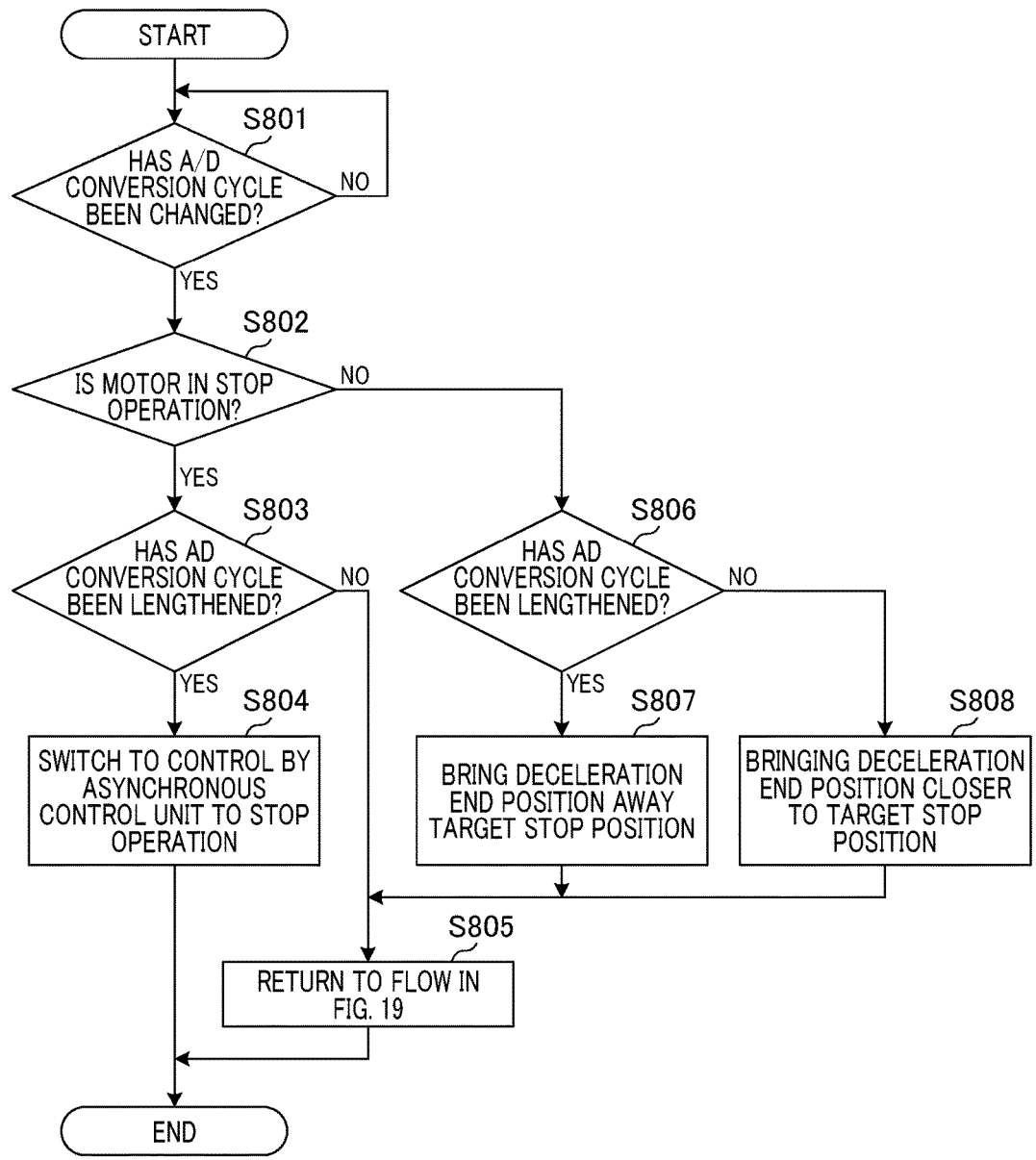
FIG. 21 is a flowchart illustrating a flow of the process according to the fourth embodiment.

FIG. 21 is a flowchart illustrating a flow of process in the present embodiment. The monitoring flow of the AD conversion cycle shown in FIG. 21 is performed in parallel with the process of the flowchart shown in FIG. 19.

In step S801, it is determined whether or not the AD conversion cycle of the position detection signals acquired by the A/D conversion cycle acquiring unit 601 has changed. If it is determined that the A/D conversion cycle of the position detection signals has changed, the process proceeds to step 802, and if not, step S801 is repeated to continue monitoring the change in the AD conversion cycle of the position detection signals. The change in the A/D conversion cycle of the position detection signals can occur at any timing in the flowchart of FIG. 19. If it is determined that a change in the A/D conversion cycle has occurred by the determination in step S801, the process in the flow in FIG. 21 is preferentially executed, returns to the flow in FIG. 19, and the processes of the flowchart are performed in order. If a change in the A/D conversion cycle is detected in step S801, the change is reported to the CPU 111 by an interrupt or the like, so that the process in FIG. 21 is preferentially executed even during the process in FIG. 19. Note that the driving of the motor itself may be continued according to the flowchart in FIG. 19. For example, if the interrupt of the process in FIG. 21 is made during clockwise driving of the motor in step S409 (during the repeating of "No" determination in step S410), the process in FIG. 21 may be performed while the motor is driven clockwise.

In step S802, the current driving state of the motor is confirmed. This is to confirm which flow in FIG. 19 corresponds to the timing at which the AD conversion cycle has changed in step S801. If the motor is in stop operation (that is, in the flow of FIG. 19, after "YES" is determined in step S410 to before "YES" is determined in step S412), the process proceeds to step S703. If the motor is currently stopped or is in an operation other than the stop operation, the process proceeds to step S806.

In step 803, it is determined whether the A/D conversion cycle is shortened or lengthened. If the A/D conversion cycle is lengthened (the interval of A/D conversion is lengthened), the process proceeds to step S804 and immediate switching to asynchronous control is performed. The rotation of the motor is controlled at a predetermined speed set by the CPU 111 up to the target stop position by the control of the asynchronous control unit 203 to fix the phase of the drive waveform at the target position. Accordingly, the motor stops rotational driving. This step corresponds to steps S413 to S414 in FIG. 19. After step S704, the process ends.

Additionally, if it is determined in step 803 that the AD conversion cycle has not been lengthened, that is, if it is determined that the A/D conversion cycle has been shortened, the process proceeds to step S805, where the process returns to a step in the flow of FIG. 19, which has been performed before proceeding to the flow of FIG. 21, and the stop operation is performed. Specifically, if the process proceeds to the flow in FIG. 21 during the deceleration process in step S411 and the determination in step S412, the process returns to the deceleration process and the determination in step S412.

If the process proceeds to step S806 as a result of determining that the motor is not in the stop operation in step S802, it is determined whether the AD conversion cycle has been shortened or lengthened in a manner similar to step S803. If the AD conversion cycle has been lengthened, the process proceeds to step S807, where the deceleration end position is distanced from the target stop position by setting a threshold larger than the one that is currently set. The threshold is set by calculating rotation amounts of the motor within the AD conversion cycle based on the speed information of the drive waveform and the AD conversion cycle acquired immediately before switching to asynchronous control when deceleration ends so as to have an interval between the deceleration end position and the target stop position longer than the amounts of the rotation. The speed information of the drive waveform is acquired by the motor speed acquisition unit 602. If the rotation amounts of the motor within the AD conversion cycle are known, there is no need to calculate the rotation amounts of the motor within the AD conversion cycle based on the speed information of the drive waveform and the AD conversion cycle.

In contrast, if the A/D conversion cycle has not been lengthened, that is, the AD conversion cycle has been shortened, the process proceeds to step S808 to set a threshold that is smaller than the currently set one, thereby bringing the deceleration end position closer to the target stop position. Since the method for calculating the deceleration end position is similar to that in step S807, the explanation will be omitted. After step S807 and step S808, the process proceeds to step S805, the motor drive control is performed in accordance with the flow of FIG. 19, and the stop operation is performed.

By carrying out the processes above, the motor can stop at the target stop position by a preferable switching to asynchronous control even if the A/D conversion cycle has been lengthened to lower a position count precision during synchronous control (lowering the resolution of the position count). Additionally, if the A/D conversion cycle has been shortened, the position count precision in the synchronization control unit is improved. Hence, it is possible to realize motor driving by which a drive waveform with less response delay can be generated by increasing a control period of time of the synchronous control unit 201. Additionally, the A/D conversion cycle can be dynamically changed regardless of the driving state of the motor.

In the present embodiment, it is determined whether or not the A/D conversion cycle itself has been changed. However, instead of the A/D conversion cycle, the control may be performed by determining whether or not the A/D conversion cycle with respect to the phase count resolution of the drive waveform has been changed.

Fifth Embodiment

In the present embodiment, a motor drive device that corrects a drive waveform if the position management register is initialized in step S407 will be described. If synchronous control and asynchronous control, which are motor control methods, are independently controlled while dynamically switching between them, there is a drawback in which the continuity of the drive waveform phase of the motor control cannot be maintained. In the present embodiment, the continuity is maintained by connecting the phase difference between the rotational position and the drive waveform while switching from asynchronous control to synchronous control. Descriptions of configurations similar to those in the third embodiment will be omitted.

Figure 22:
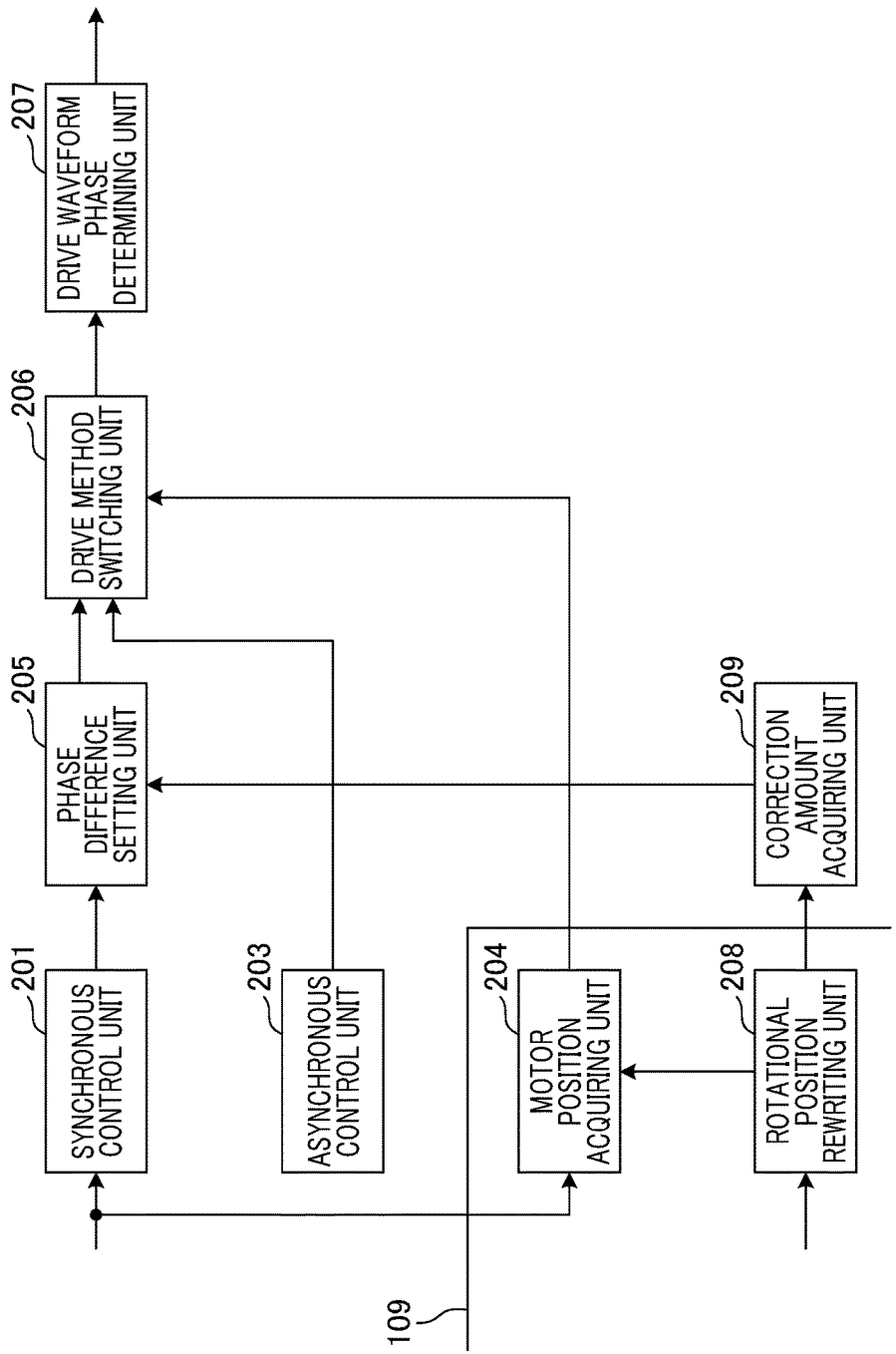
FIG. 22 is a block diagram illustrating a configuration of the drive waveform generating circuit according to a fifth embodiment.

FIG. 22 illustrates the internal configuration of the drive circuit in the present embodiment. The drive circuit in the present embodiment is different from the drive circuit in the first embodiment in that it includes a correction amount acquiring unit 209. However, the synchronous control unit 201 to the rotational position rewriting unit 208 are similar to those in the third embodiment, so that the description will be omitted.

When rewriting the rotational position of the motor by the rotational position rewriting unit 208, the correction amount acquiring unit 209 acquires a correction amount for correcting the phase difference set by the phase difference setting unit 205, and outputs the acquired correction amount to the phase difference setting unit 205. The correction amount acquiring unit 209 will be described in more detail with reference to FIG. 23.

The phase difference setting unit 205 in the present embodiment adds the correction amount to the phase difference that has been set. Thereby, the phase difference between the rotational position and the drive waveform is corrected.

In general, an attachment error occurs in the reset mechanism 121. If the precision of position detection is, for example, 10 bit precision per one turn (one rotation) of the rotor as shown in FIG. 3, a deviation occurs in the motor rotational position unless it is contained within the attachment error within this precision. In the asynchronous control, the reset mechanism 121 is used only for detecting the information about the rotation of the motor, so that, in particular, this error does not cause a drawback. Additionally, in the position detection signals with a square wave, since the precision in position detection is low, it is relatively easy to contain the attachment error within a degree not causing a drawback. However, if the precision of the position detection is high, it is sometimes difficult to contain the attachment error within a degree not causing a drawback. Therefore, in the present embodiment, this error is corrected by using the correction amount that has been acquired by the correction amount acquiring unit 209.

Figure 23:
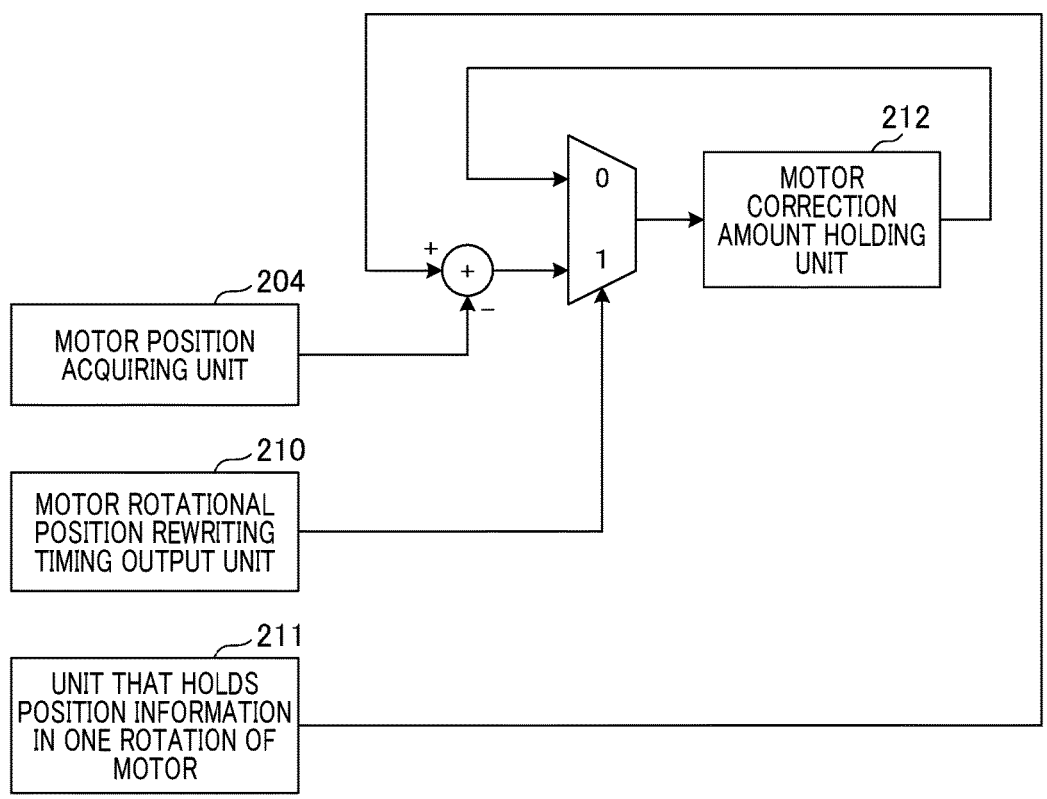
FIG. 23 is a block diagram illustrating a configuration of a correction amount acquiring unit according to the fifth embodiment.

FIG. 23 illustrates the internal configuration of the correction amount acquiring unit 209.

The correction amount acquiring unit 209 includes a motor rotational position rewriting timing output unit 902, a holding unit 903 that holds position information in one rotation of motor (hereinafter, referred to as "position information holding unit"), a motor correction amount holding unit 904, and an adding unit 905.

The motor rotational position rewriting timing output unit 902 is a unit that outputs flag information indicating that the rotational position rewriting unit 208 has rewritten the rotational position of the motor.

The position information holding unit 903 holds the position information for one rotation indicating at what angle in one rotation the motor is located, from among pieces of information about the rotational position of the motor acquired by the position ENC circuit 109. In other words, the position information holding unit 903 holds the information about the position in one rotation indicating at what angle in one rotation the motor is located, from among pieces of the information about the rotational position before being rewritten.

The adding unit 905 acquires the difference between the information about the position in one rotation of the motor before being rewritten and the information about the position in one rotation of the motor after being rewritten by subtracting the information about the position in one rotation of the motor after being rewritten from the information about the position in one rotation of the motor before being rewritten by the reset process. The information about the position in one rotation of the motor before being rewritten is acquired from the position information holding unit 903. The information about the position in one rotation of the motor after being rewritten is acquired by acquiring the information about the position in one rotation indicating at what angle in one rotation the motor is located, from among the pieces of information about the rotational position of the motor held by the motor position acquiring unit 204.

The motor correction amount holding unit 904 holds the result of addition (subtracted result) acquired by the adding unit to serve as a correction amount of the motor in accordance with a flag indicating that the rotational position rewriting unit 208 has rewritten the rotational position of the motor by the reset process. If the correction amount of the motor has been held in advance, the motor correction amount holding unit 904 overwrites the correction amount.

Accordingly, the correction amount acquiring unit 209 acquires and holds the difference in the position information within one rotation before and after being rewritten by the reset process to serve as a correction amount.

Since the drive sequence of the motor in the present embodiment is similar to the flowchart shown in FIG. 19, only the difference will be described with reference to FIG. 19. Steps S401 to S406 are similar to those in the third embodiment, so that the description thereof will be omitted.

In step S407, in a manner similar to the third embodiment, a process that rewrites the information about the rotational position of the motor to the reference position is performed by the rotational position rewriting unit 208. As described above, the reference position slightly deviates due to the attachment error of the reset mechanism 121 and the time lag from the detection of the change in the reset signal to the stop. This is because the output phase of the drive waveform changes if the information about the position of the motor in one rotation has been rewritten. Since this error is always uniform during the asynchronous control, it is not necessary to correct the error.

In the subsequent step S408, synchronization control is turned on in a manner similar to the third embodiment. At this time, the phase difference setting unit 205 corrects the phase difference that has been set by adding the correction amount of the motor acquired by the correction amount acquiring unit 209 to the phase difference that has been set. Thus, by adding the correction amount of the motor, the output phase of the drive waveform does not change immediately after switching the control method to synchronous control even if the drive control method is switched from asynchronous control to synchronous control by the motor drive device in which the reset mechanism 121 has an attachment error. That is, since the continuity of the drive waveform is maintained even when switching from asynchronous control to synchronous control, the control method can be switched smoothly.

Since step S409 and the subsequent steps are similar to those in the third embodiment, the description will be omitted.

By carrying out the configuration and processes described above embodiments, it is possible to realize a drive device that can generate a drive waveform with less response delay to the motor by using the synchronization control unit and to maintain the continuity of the drive waveform of the motor even if the asynchronous control and the synchronous control are dynamically switched.

[Modification]

In the position detecting unit in the third to fifth embodiments described above, the configuration using a Hall sensor and a rotating magnet is used. However, the present invention may be carried out by also using other sensor mechanisms as long as it has a configuration in which the rotational position can be detected with sufficiently high precision.

In the third to fifth embodiments described above, although the stepping motor is assumed to be used, another motor may be used if the motor has a configuration in which a permanent magnet is arranged at the rotor side and a coil stator is arranged as the stator side.

Additionally, it is possible to combine the fourth embodiment and the fifth embodiment. Even if there is no need to consider the lowering of precision in stopping as in the case of the sufficiently short AD conversion cycle, the motor can be driven while maintaining the continuity of the drive waveform of the motor by executing the correction of the phase difference set in the third embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-110755, filed Jun. 5, 2017, Japanese Patent Application No. 2017-230828, filed Nov. 30, 2017, and Japanese Patent Application No. 2018-095541, filed May 17, 2018 which are hereby incorporated by reference wherein in its entirety.

What is claimed is:

1. A motor drive device that drives a motor to rotate comprising:
   at least one processor or one circuitry which functions as:
     a detecting unit configured to detect a rotational position of a rotor;
     a generating unit configured to generate a drive waveform to be output to the motor;
     a control unit configured to perform control that synchronizes a phase of the rotational position and a phase of the drive waveform; and
     a phase difference setting unit configured to set a phase difference between the rotational position and the drive waveform in a state in which the phase of the rotational position and the phase of the drive waveform are synchronized,
   wherein the detecting unit comprises:
     a first calculating unit configured to calculate a first count values based on a plurality of signals that change with the rotation of the rotor;
     a second calculating unit configured to acquire the first count values and calculate a second count values having a first upper limit value; and
     a third calculating unit configured to acquire the second count values, perform a process that multiplies the second count values by a conversion ratio that has been set, and calculate a third count values having a second upper limit value.

2. The motor drive device according to claim 1, wherein the first calculating unit calculates the first count values proportional to the rotation amounts of the rotor, and
   wherein the second calculating unit calculates the second count values that periodically changes with respect to the rotation amounts, with the first upper limit value as a maximum value.

3. The motor drive device according to claim 1, further comprising:
   a setting unit configured to set the first upper limit value, wherein the first upper limit value is a value corresponding to a count value at the rotational position calculated by the first calculating unit if the rotor rotates once.

4. The motor drive device according to claim 1, further comprising:
   a setting unit configured to set the conversion ratio, wherein the conversion ratio is a ratio for converting the count value for one rotation of the rotor to a count value of the drive waveform corresponding to the one rotation of the rotor.

5. The motor drive device according to claim 1, wherein the plurality of signals that change with the rotation of the rotor are a plurality of sine-wave signals having a phase difference, and
   wherein the detecting unit calculates the signals to detect the rotational position of the rotor.

6. The motor drive device according to claim 5, wherein the first calculating unit calculates a tangent value based on the signals, calculates a rotation angle of the rotor by performing an arc tangent calculation on the tangent value, and integrates the rotation angle, thereby generating the rotational position information for the rotor.

7. The motor drive device according to claim 1, further comprising:
   a fourth calculating unit configured to acquire the third count values, integrate at least either one a range of value where the third count value is an overflow and a range of value where the third count value is an underflow due to the driving of the rotor by one rotation, and calculate amounts of integration at the rotational position as the position information.

8. The motor drive device according to claim 7, further comprising:
   a fifth calculating unit configured to acquire the position information from the fourth calculating unit and calculate data having an offset value,
   wherein the control unit records amounts of the difference between a value acquired by rewriting the data and the position information calculated by the fourth calculating unit in a memory to serve as the offset value.

9. The motor drive device according to claim 8, wherein the generating unit comprises a phase determining unit configured to acquire data calculated by the fifth calculating unit and determine a phase of the drive waveform, and
   wherein the phase difference setting unit sets a steady phase difference and a driving phase difference to the phase determining unit.

10. The motor drive device according to claim 9, wherein the control unit performs a process that calculates the steady phase difference based on the count value of the phase of the drive waveform held by the phase determining unit in a state in which the rotor stops and the data calculated by the fifth calculation unit, and sets the stationary phase difference via the phase difference setting unit.

11. The motor drive device according to claim 9, wherein the control unit performs a process that sets the driving phase difference via the phase difference setting unit by using data indicating the relation of the steady rotational speed of the motor or a torque generated by the motor, which correspond to amounts of the phase difference between the phase of the rotational position of the rotor and the phase of the drive waveform.

12. The motor drive device according to claim 1, wherein the control unit calculates amounts of control the phase difference based on amounts of a difference between a target speed of the rotor and a detected speed calculated as a change in the rotational position, and controls the speed of the rotor.

13. The motor drive device according to claim 1 further comprising:
a switching unit configured to switch between synchronous control, in which the generating unit generates the drive waveform based on the phase of the rotational position, and asynchronous control, in which the generating unit generates the drive waveform based on a frequency that has been set,
wherein the switching unit switches from synchronous control to asynchronous control if it is determined that a difference between the rotational position and the target stop position of the motor is equal to or less than a threshold.

14. The motor drive device according to claim 13,
wherein the threshold is within the detected interval of the detecting unit and is larger than rotation amounts by which the motor rotates by synchronous control immediately before switching from synchronous control to asynchronous control.

15. The motor drive device according to claim 14,
wherein the detecting unit further comprises:
an AD conversion unit configured to input a position detection signal as an analog signal and periodically convert the analog signal into a digital signal; and
a motor position acquiring unit configured to acquire a rotational position of the motor based on the position detection signal that has been converted into a digital signal,
wherein the detection interval of the detecting unit is an AD conversion cycle of the position detection signal converted by the AD conversion unit.

16. The motor drive device according to claim 15, further comprising:
a threshold setting unit configured to set the threshold based on the AD conversion cycle converted by the AD conversion unit,
wherein the threshold setting unit sets the threshold such that the threshold becomes larger when the AD conversion cycle is a second cycle that is shorter than the first cycle compared to when the AD conversion cycle is the first cycle.

17. The motor drive device according to claim 15 further comprising:
a motor speed acquiring unit configured to acquire rotation amounts of the motor within the AD conversion cycle; and
a threshold setting unit configured to set the threshold based on the rotation amounts of the motor within the AD conversion cycle,
wherein the threshold setting unit sets the threshold such that threshold becomes larger when the rotation amount of the motor within the AD conversion cycle is a second amount, which is smaller than a first amount, compared to when the rotation amount of the motor within the AD conversion cycle is the first amount.

18. The motor drive device according to claim 1 further comprising:
a holding unit configured to hold rotational position information of the motor;
a rotational position rewriting unit configured to rewrite the rotational position of the motor held by the holding unit; and
a correction amount acquiring unit configured to acquire a correction amount of the drive waveform in accordance with rewriting of the rotational position of the motor,
wherein the correction amount acquiring unit acquires a correction amount of the drive waveform based on a difference between the rotational position of the motor before the rotational position of the motor is rewritten by the rotational position rewriting unit and the rotational position of the motor after the rotational position of the motor is rewritten.

19. The motor drive device according to claim 18,
wherein the correction amount acquiring unit outputs the correction amount to the phase difference setting unit, and
wherein the phase difference setting unit corrects the phase difference that has been set based on the correction amount.

20. A method for driving a motor executed in a motor drive device that drives a motor to rotate, the method comprising:
detecting a rotational position of a rotor;
generating a drive waveform to be output to the motor;
performing control to synchronize a phase of the rotational position and a phase of the drive waveform; and
setting a phase difference between the rotational position and the drive waveform in a state in which the phase of the rotational position and the phase of the drive waveform are synchronized,
wherein the detecting is performed by calculating a first count values based on a plurality of signals that change with the rotation of the rotor, calculating a second count values having a first upper limit value, multiplying the second count values by the a conversion ratio that has been set, and calculating a third count values having a second upper limit value.

* * * * *